(12) United States Patent
Xie et al.

(10) Patent No.: US 9,094,749 B2
(45) Date of Patent: Jul. 28, 2015

(54) HEAD-MOUNTED SOUND CAPTURE DEVICE

(75) Inventors: Peng Xie, Santa Clara, CA (US); Sean M. White, Sunnyvale, CA (US); Kantapon Kaewtip, Los Angeles, CA (US); Lance Williams, Toluca Lake, CA (US)

(73) Assignee: Nokia Technologies Oy, Espoo (FI)

( * ) Notice: Subject to any disclaimer, the term of this patent is extended or adjusted under 35 U.S.C. 154(b) by 350 days.

(21) Appl. No.: 13/557,895

(22) Filed: Jul. 25, 2012

(65) Prior Publication Data

US 2014/0029762 A1 Jan. 30, 2014

(51) Int. Cl.
*H04B 15/00* (2006.01)
*H04R 5/027* (2006.01)
*H04R 3/00* (2006.01)
(Continued)

(52) U.S. Cl.
CPC .................. *H04R 5/027* (2013.01); *H04R 3/00* (2013.01); *H04B 2001/3866* (2013.01); *H04M 1/05* (2013.01); *H04M 1/6066* (2013.01); *H04R 3/005* (2013.01); *H04R 2410/03* (2013.01); *H04R 2410/05* (2013.01); *H04R 2420/07* (2013.01); *H04R 2430/03* (2013.01); *H04R 2460/13* (2013.01)

(58) Field of Classification Search
CPC ...... H04R 2460/13; H04R 11/00; H04R 1/14; H04R 1/46; H04R 25/606; H04R 3/005
USPC ......................................... 381/122, 151, 94.1
See application file for complete search history.

(56) References Cited

U.S. PATENT DOCUMENTS 2,915,598 A 12/1959 Brunton
4,520,238 A * 5/1985 Ikeda ............................ 381/151
(Continued)

FOREIGN PATENT DOCUMENTS

EP 1083769 A1 3/2001
GB 2461315 A 12/2009
(Continued)

OTHER PUBLICATIONS

Z. Liu, Z. Zhang, A. Acero, J. Droppo, and X. D. Huang, Direct Filtering For Air- and Bone-Conductive Microphones, [IEEE International Workshop on Multimedia Signal Processing (MMSP), Siena, Italy, 2004], (4 pages).
(Continued)

*Primary Examiner* — Simon Sing
(74) *Attorney, Agent, or Firm* — Harrington & Smith

(57) ABSTRACT

A platform that is configured to be removably placed symmetrically on or about a user's head has at least a first transducer configured to capture vibration of the user's skull or facial movement generated by the user's voice activity and to detect the user's speaking activity. This first transducer converts the vibration or facial movement into a first electrical audio signal. The electrical audio signal from the first transducer is processed by circuitry or embodied software as voiced frames and/or as unvoiced frames, in which the voiced frames and/or the unvoiced frames are defined based at least on the first electrical audio signal. Multiple embodiments follow from this: where the first transducer is a vibration sensor; where voice is captured by an air microphone and filtering adaptation differs for the voiced versus unvoiced frames as defined by the first transducer, and another with at least three air microphones.

17 Claims, 15 Drawing Sheets

(51) Int. Cl.
*H04B 1/3827* (2015.01)
*H04M 1/05* (2006.01)
*H04M 1/60* (2006.01)

(56) References Cited

U.S. PATENT DOCUMENTS

| | | | | |
|---|---|---|---|---|
| 4,819,270 | A | | 4/1989 | Lombardo ............... 381/26 |
| 5,280,524 | A | * | 1/1994 | Norris ............... 379/388.02 |
| 5,625,843 | A | * | 4/1997 | Lee ............... 710/22 |
| 5,933,506 | A | * | 8/1999 | Aoki et al. ............... 381/151 |
| 6,629,076 | B1 | | 9/2003 | Haken ............... 704/271 |
| 7,031,483 | B2 | | 4/2006 | Boone et al. ............... 381/313 |
| 7,289,767 | B2 | | 10/2007 | Lai ............... 455/66.1 |
| 7,346,504 | B2 | | 3/2008 | Liu et al. ............... 704/226 |
| 7,383,181 | B2 | | 6/2008 | Huang et al. ............... 704/231 |
| 7,406,303 | B2 | | 7/2008 | Deng et al. ............... 455/260 |
| 7,447,630 | B2 | | 11/2008 | Liu et al. ............... 704/228 |
| 7,499,686 | B2 | | 3/2009 | Sinclair et al. ............... 455/223 |
| 7,555,136 | B2 | | 6/2009 | Wang ............... 381/380 |
| 7,609,842 | B2 | | 10/2009 | Sipkema et al. ............... 381/327 |
| 7,680,656 | B2 | | 3/2010 | Zhang et al. ............... 704/233 |
| 7,684,571 | B2 | | 3/2010 | Grosvenor et al. ............... 381/92 |
| 7,792,552 | B2 | | 9/2010 | Thomas et al. ............... 455/569.1 |
| 7,983,907 | B2 | | 7/2011 | Visser et al. ............... 704/227 |
| 8,098,844 | B2 | | 1/2012 | Elko ............... 381/94.1 |
| 8,139,801 | B2 | | 3/2012 | Sipkema et al. ............... 381/327 |
| 2002/0110252 | A1 | * | 8/2002 | Liu ............... 381/120 |
| 2004/0076301 | A1 | | 4/2004 | Algazi et al. ............... 381/17 |
| 2005/0027515 | A1 | * | 2/2005 | Huang et al. ............... 704/215 |
| 2005/0244020 | A1 | * | 11/2005 | Nakajima et al. ............... 381/151 |
| 2006/0079291 | A1 | | 4/2006 | Granovetter et al. ............... 455/563 |
| 2006/0120537 | A1 | | 6/2006 | Burnett et al. ............... 381/71.6 |
| 2007/0088544 | A1 | | 4/2007 | Acero et al. ............... 704/226 |
| 2007/0098192 | A1 | | 5/2007 | Sipkema et al. ............... 381/312 |
| 2009/0252360 | A1 | | 10/2009 | Sipkema et al. ............... 381/327 |
| 2009/0281390 | A1 | * | 11/2009 | Qiu et al. ............... 600/199 |
| 2010/0172519 | A1 | * | 7/2010 | Kimura ............... 381/151 |
| 2010/0290660 | A1 | * | 11/2010 | Fukuda ............... 381/355 |
| 2011/0010172 | A1 | | 1/2011 | Konchitsky ............... 704/233 |
| 2011/0288860 | A1 | | 11/2011 | Schevciw et al. ............... 704/233 |
| 2011/0293109 | A1 | | 12/2011 | Nystrom et al. ............... 381/94.2 |
| 2013/0022220 | A1 | * | 1/2013 | Dong et al. ............... 381/151 |

FOREIGN PATENT DOCUMENTS

| | | |
|---|---|---|
| JP | 2011209548 A | 10/2011 |
| WO | WO-2004016037 A1 | 2/2004 |
| WO | WO-2009101622 A2 | 8/2009 |
| WO | WO-2011161487 A1 | 12/2011 |

OTHER PUBLICATIONS

Z. Liu, A. Subramanya, Z. Zhang, J. Droppo, and A. Acero, Leakage Model and Teeth Clack Removal for Air- and Bone-Conductive Integrated Microphones, [Proceedings of IEEE International Conference on Acoustics, Speech, and Signal Processing (ICASSP '05), Philadelphia, PA, USA, 2005.], (4 pages).

http://www.temcoj.co.jp/web/webAction.do?method=productDetail&productId=fcaaf8b4227210b501227952bd4a0032, (2 pages).

"Multisensory processing for speech enhancement and magnitude-normalized spectra for speech modeling", Amaranag Subramanya et al., Speech Communication 50, Mar. 2008, pp. 228-243.

* cited by examiner

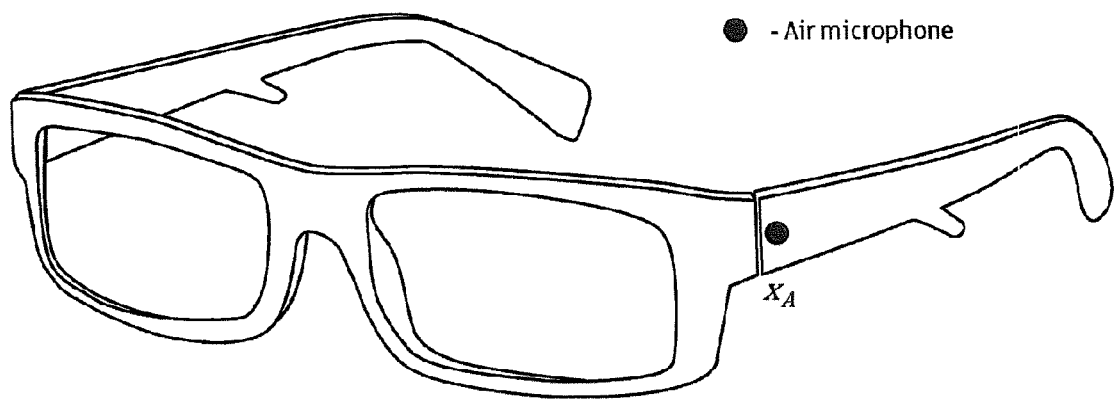
Figure 2:
Prior Art
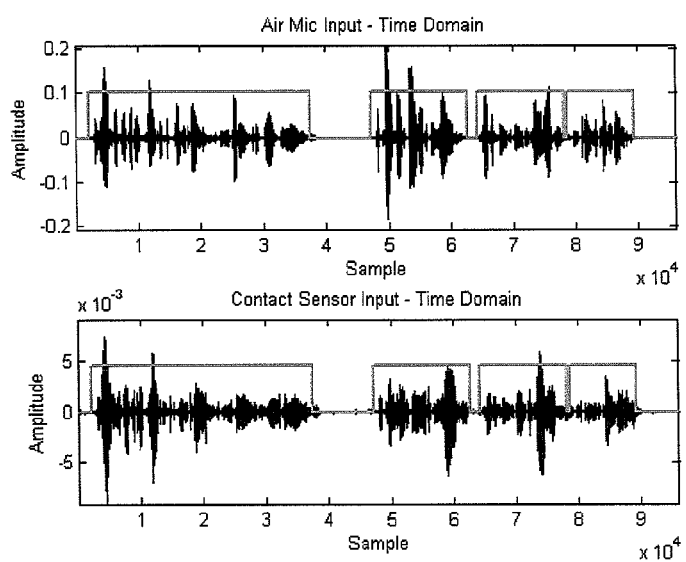
Figure 3A
Figure 3B

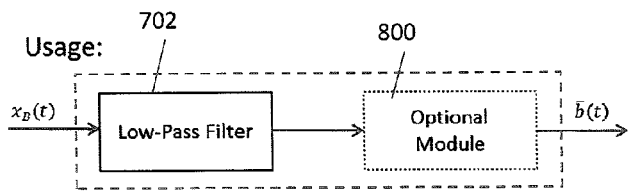
Figure 7
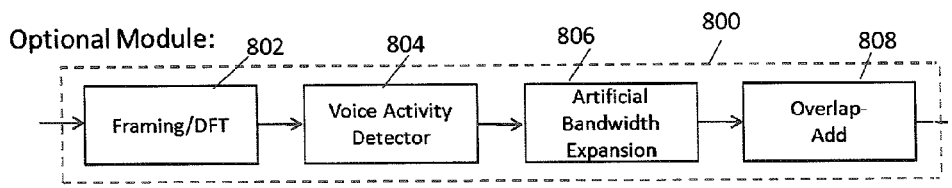
Figure 8
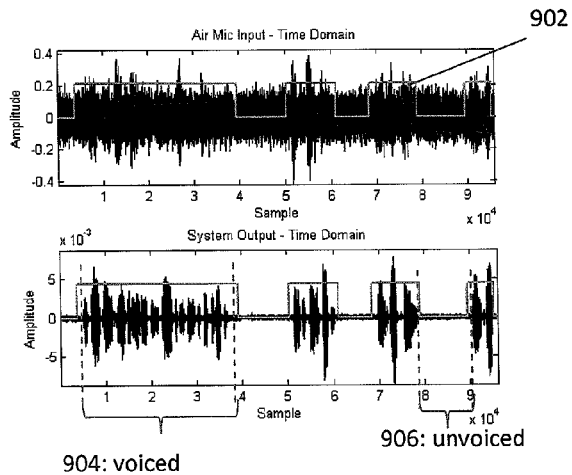
Figure 9A
Figure 9B
904: voiced   906: unvoiced
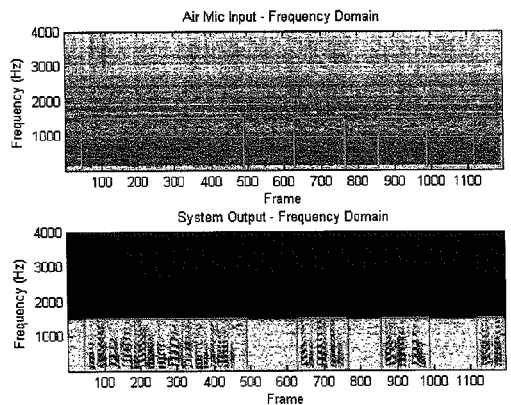
Figure 10A
Figure 10B

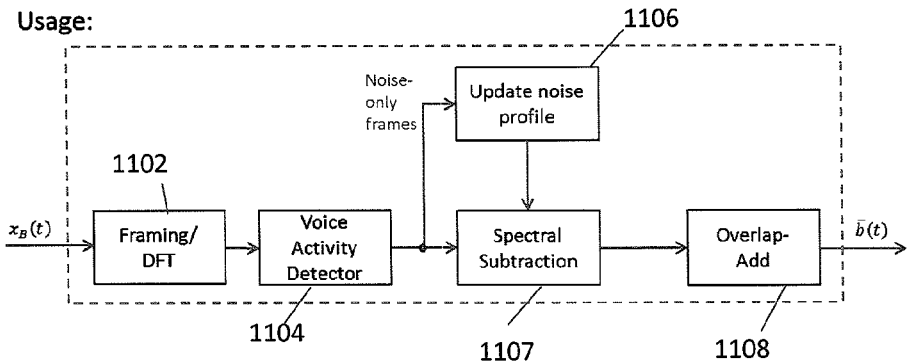
Figure 11
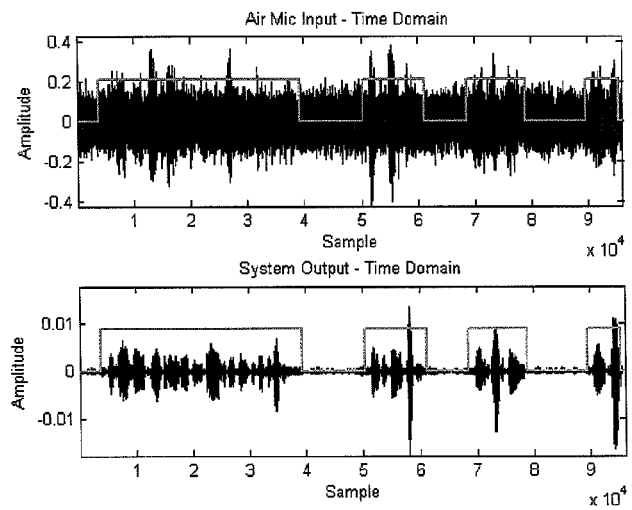
Figure 12A
Figure 12B
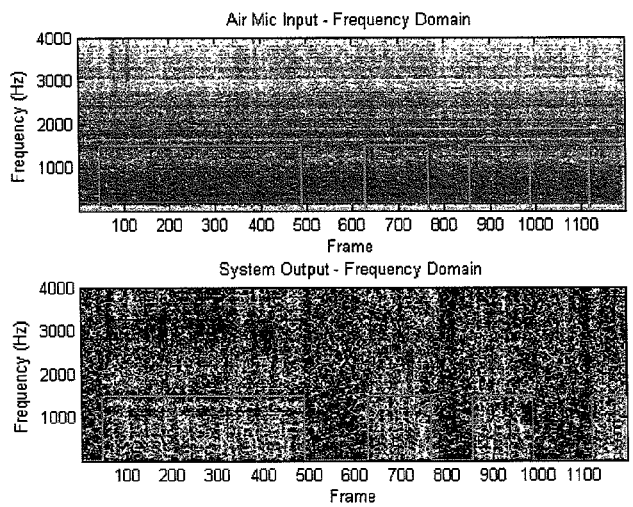
Figure 13A
Figure 13B

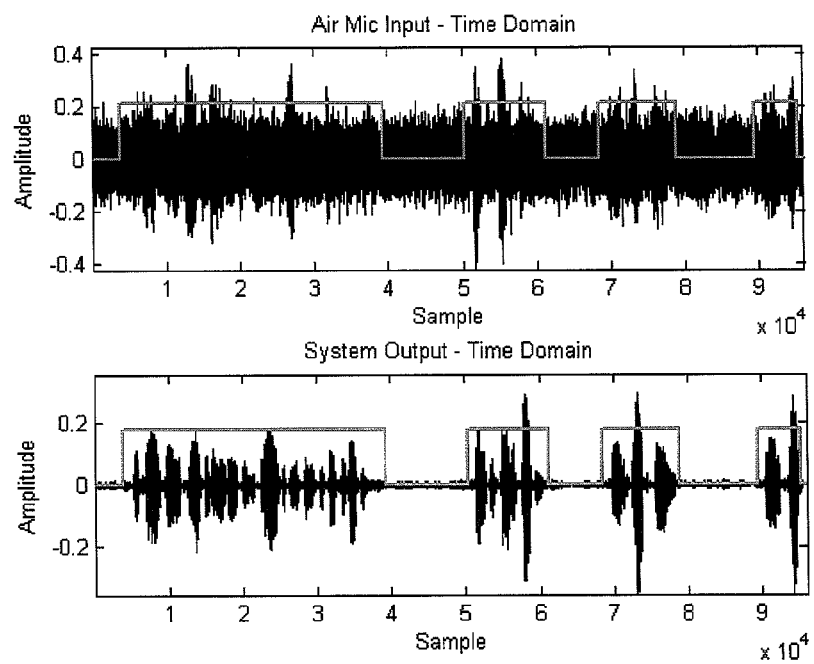
Figure 17A
Figure 17B
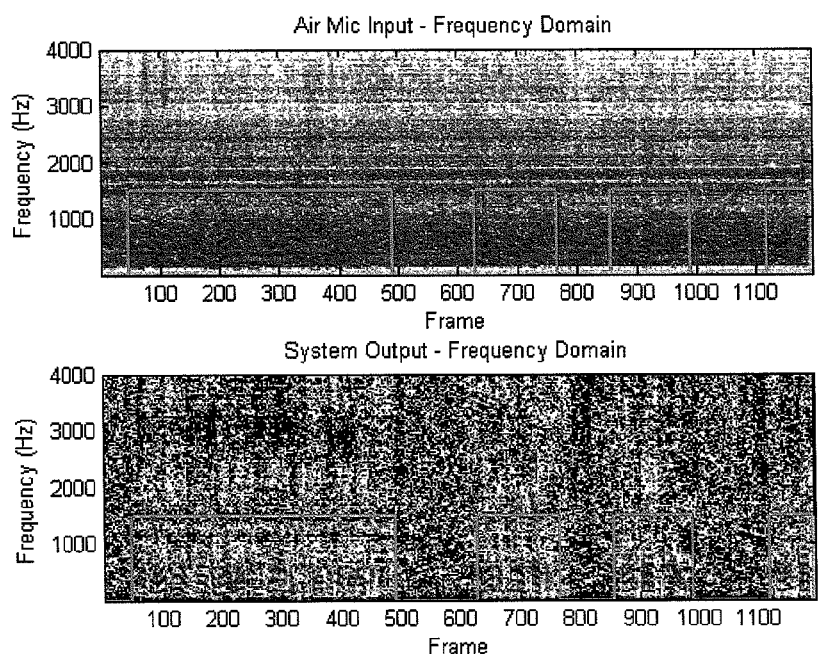
Figure 18A
Figure 18B

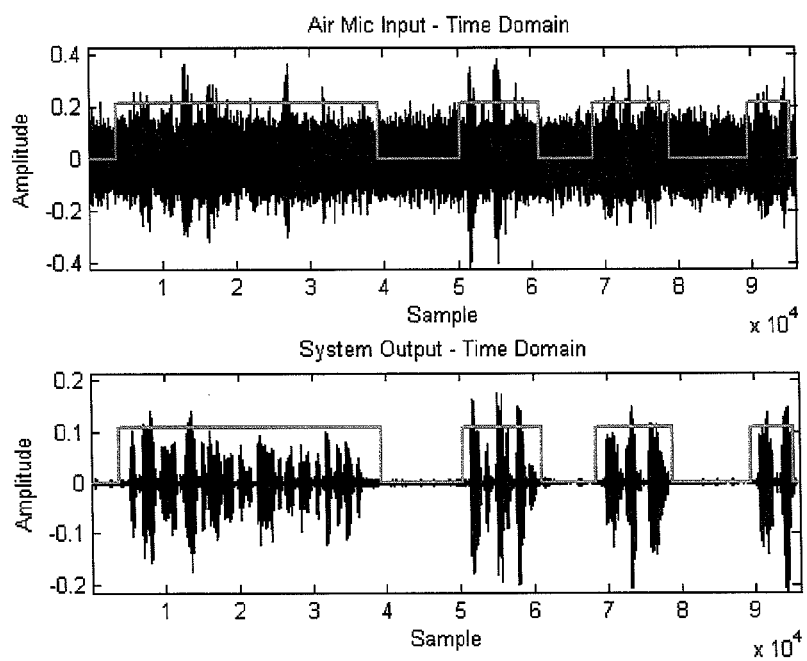
Figure 20A
Figure 20B
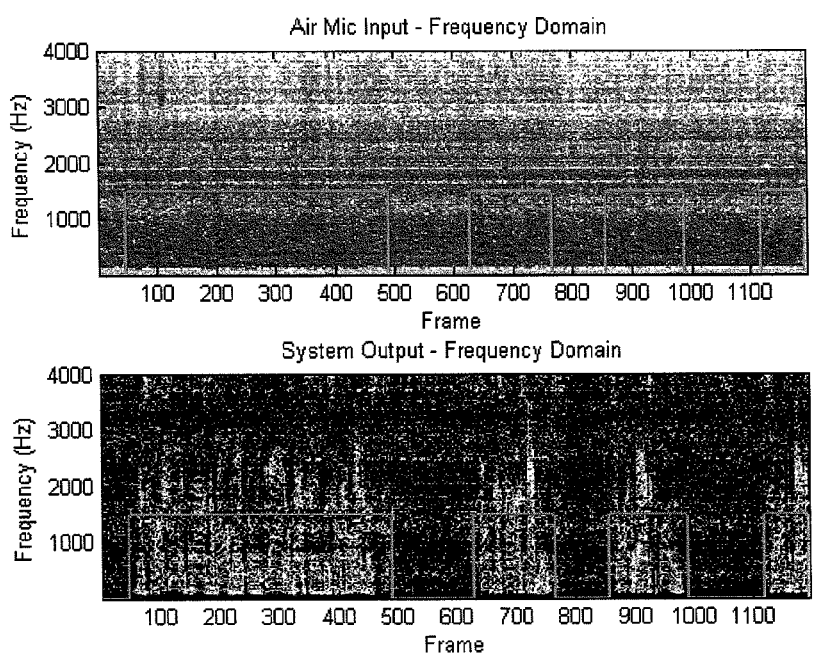
Figure 21A
Figure 21B 2208, alternate location for voice activity sensor

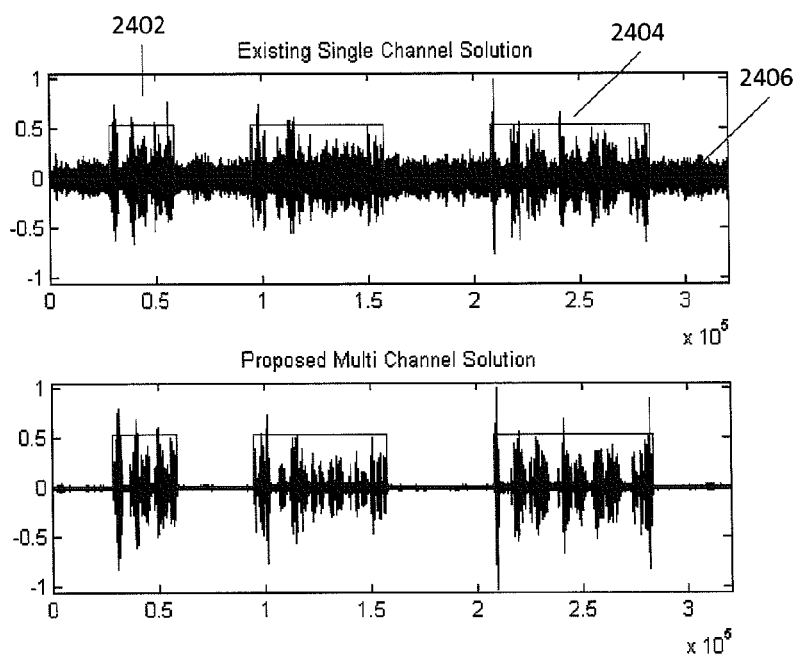
Figure 24A
Figure 24B
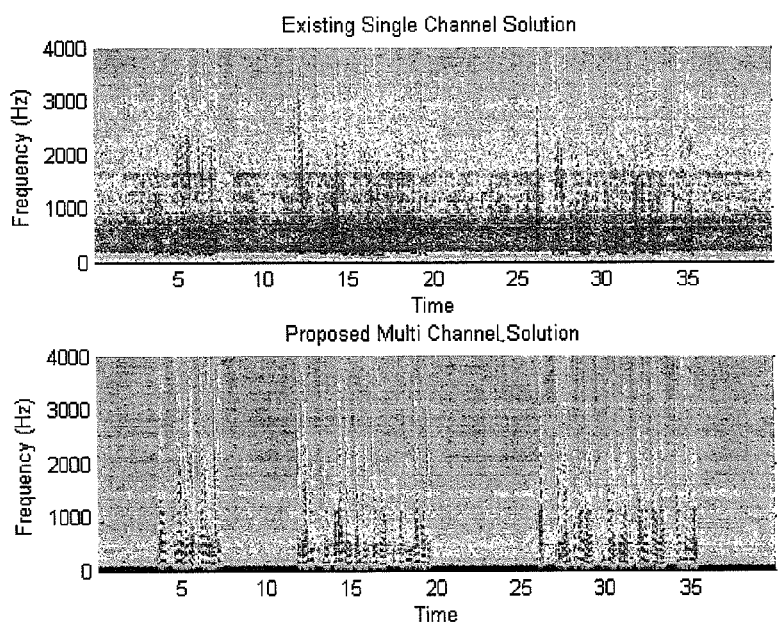
Figure 25A
Figure 25B

HEAD-MOUNTED SOUND CAPTURE DEVICE

TECHNICAL FIELD

The exemplary and non-limiting embodiments of this invention relate generally to arrays of sensors (and in some embodiments also one or more sensors) for voice capture which are mounted to spectacles, helmets, headbands or other devices mounted symmetrically about a user's head, and the specific examples concern the arrangement of such arrays as well as noise reduction, multiple sensors, bone conduction, adaptive filtering, and binaural and directional recording of ambient sound captured at such a device.

BACKGROUND

Hands-free mobile communication is often facilitated with wireless headsets having a Bluetooth link with the mobile handset, which allows the user to conveniently and safely communicate while engaged in another activity such as driving. But the use of headsets raises new issues of styling, comfort, and most of all, ambient noise, which often causes voice quality to be sacrificed.

Speech signals corrupted by additive ambient noise has long been a major challenge for voice communication and speech user interfaces for mobile terminals and speech recorders, particularly in highly noisy environments. End retail users often prefer that the microphone is not in close proximity to their mouths, which makes the challenge of capturing quality vocal signals even more pronounced. Such a headset's microphone is prone to pick up more ambient sounds than one disposed closer to the speaker's mouth, resulting in lower signal-to-noise ratio (SNR) and lower speech intelligibility.

Users have also placed a high value on comfort and appearance of these headsets. Typically such headsets are mounted in or around the ear, which causes discomfort from prolonged use. These sometimes also interfere with eyeglasses or sunglasses which the user might be wearing. When a headset speaker is implemented as an earbud or similar in-the-ear arrangement, they can sometimes block out ambient sound to an extent that is unacceptable. At least one recent survey found a large minority of those surveyed considered conventional Bluetooth headsets unattractive.

Research in improving the above concerns has been ongoing. For example, noise-reduction techniques to suppress ambient noise in ear-mounted Bluetooth headsets are detailed for example at U.S. Pat. No. 7,983,907 entitled HEADSET FOR SEPARATION OF SPEECH SIGNALS IN A NOISY ENVIRONMENT; and U.S. Pat. No. 8,098,844 entitled DUAL-MICROPHONE SPATIAL NOISE SUPPRESSION; as well as US Patent Application Publications 2006/0120537 entitled NOISE SUPPRESSING MULTI-MICROPHONE HEADSET; 2007/0088544 entitled CALIBRATION BASED BEAMFORMING, NON-LINEAR ADAPTIVE FILTERING, AND MULTI-SENSOR HEADSET; and 2011/0010172 entitled NOISE REDUCTION SYSTEM USING A SENSOR BASED SPEECH DETECTOR.

There are also commercially available Bluetooth headsets implemented as spectacles/eyeglasses. Existing techniques can be seen at U.S. Pat. No. 7,289,767 entitled WIRELESS COMMUNICATION GLASSES; U.S. Pat. No. 7,792,552 entitled EYEGLASSES FOR WIRELESS COMMUNICATIONS; and U.S. Pat. No. 7,684,571 entitled SYSTEM AND METHOD OF GENERATING AN AUDIO SIGNAL. Further example includes Temco Vibraudio model GL41AB which is a bone-conduction Bluetooth arrangement on sunglasses and currently available in Japan (online product literature at http://www.temco-j.co.jp/web/webAction.do?method=productDetail&productId=fcaaf8b4227210b501227952bd4a0032).

In a somewhat related vein are hearing aids implemented in eyeglasses, some of which also incorporate a microphone or multiple microphones to pick up ambient sound for amplification via the hearing aid portion. See for example U.S. Pat. No. 6,629,076 entitled METHOD AND DEVICE FOR AIDING SPEECH; U.S. Pat. No. 7,031,483 entitled HEARING AID COMPRISING AN ARRAY OF MICROPHONES; U.S. Pat. No. 7,609,842 entitled SPECTACLE HEARING AID; and U.S. Pat. No. 8,139,801 entitled HEARING AID GLASSES USING ONE OMNI MICROPHONE PER TEMPLE.

Further references which might be relevant to the teachings below include U.S. Pat. No. 4,520,238 entitled PICKUP DEVICE FOR PICKING UP VIBRATION TRANSMITTED THROUGH BONES; U.S. Pat. No. 7,555,136 entitled NASAL BONE CONDUCTION WIRELESS COMMUNICATION TRANSMITTING DEVICE; U.S. Pat. No. 7,447,630 entitled METHOD AND APPARATUS FOR MULTI-SENSORY SPEECH ENHANCEMENT; U.S. Pat. No. 7,346,504 entitled MULTI-SENSORY SPEECH ENHANCEMENT USING A CLEAN SPEECH PRIOR; U.S. Pat. No. 7,406,303 entitled MULTI-SENSORY SPEECH ENHANCEMENT USING SYNTHESIZED SENSOR SIGNAL; U.S. Pat. No. 7,499,686 entitled METHOD AND APPARATUS FOR MULTI-SENSORY SPEECH ENHANCEMENT ON A MOBILE DEVICE; and U.S. Pat. No. 7,680,656 entitled MULTI-SENSORY SPEECH ENHANCEMENT USING A SPEECH-STATE MODEL. Additionally, reference is made to the following research papers: Z. Liu, Z. Zhang, A. Acero, J. Droppo, and X. D. Huang, DIRECT FILTERING FOR AIR-AND BONE-CONDUCTIVE MICROPHONES, [IEEE International Workshop on Multimedia Signal Processing (MMSP), Siena, Italy, 2004]; and Z. Liu, A. Subramanya, Z. Zhang, J. Droppo, and A. Acero, LEAKAGE MODEL AND TEETH CLACK REMOVAL FOR AIR-AND BONE-CONDUCTIVE INTEGRATED MICROPHONES, [Proceedings of IEEE International Conference on Acoustics, Speech, and Signal Processing (ICASSP '05), Philadelphia, Pa., USA, 2005.]

SUMMARY

According to a first exemplary aspect the invention there is an apparatus comprising: a platform, configured to be removably placed symmetrically on or about a user's head; at least a first transducer configured to capture vibration of the user's skull or facial movement generated by the user's voice activity and detect the user's speaking activity, in which the at least first transducer converts the vibration or facial movement into a first electrical audio signal; and one or more circuitries and/or one or more memories including computer program code for processing the at least the electrical audio signal from the at least first transducer received at the platform as voiced frames and/or as unvoiced frames, in which the voiced frames and/or the unvoiced frames are defined based at least on the first electrical audio signal.

According to a second exemplary aspect the invention there is a method comprising: determining from at least a first electrical audio signal from a first transducer voiced frames during which a user is speaking and unvoiced frames during which the user is not speaking, in which the first transducer is disposed on a platform configured to be removably placed symmetrically on or about a user's head and is configured to capture vibration of the user's skull or facial movement generated by the user's voice activity and detect the user's speaking activity; and processing the first electrical audio signal received at the platform as the voiced frames and/or as the unvoiced frames.

According to a third exemplary aspect the invention there is a computer readable memory storing a program of computer readable instructions which when executed by at least one processor result in actions comprising: determining from at least a first electrical audio signal from a first transducer voiced frames during which a user is speaking and unvoiced frames during which the user is not speaking, in which the first transducer is disposed on a platform configured to be removably placed symmetrically on or about a user's head and is configured to capture vibration of the user's skull or facial movement generated by the user's voice activity and detect the user's speaking activity; and processing the first electrical audio signal received at the platform as the voiced frames and/or as the unvoiced frames.

According to a fourth exemplary aspect the invention there is an apparatus comprising a platform, configured to be removably placed symmetrically on or about a user's head; at least two transducers disposed about opposed sides of the platform; and circuitry or embodied software for resolving a spatial signal from signals output from the at least two transducers.

According to a fifth exemplary aspect the invention there is a method comprising: receiving signals from at least two transducers disposed about opposed sides of a platform, configured to be removably placed symmetrically on or about a user's head; and resolving a spatial signal from the received signals.

According to a sixth exemplary aspect the invention there is a memory storing a program of computer readable instructions which when executed by at least one processor result in actions comprising: in response to receiving signals from at least two transducers disposed about opposed sides of a platform, configured to be removably placed symmetrically on or about a user's head, resolving a spatial signal from the received signals.

These and other aspects are detailed further below.

BRIEF DESCRIPTION OF THE DRAWINGS

FIG. 2 illustrates a prior art arrangement of an air microphone disposed on eyeglasses.

FIGS. 3A-B and 4A-B show experimental results from the air microphone only of FIG. 2 and the vibration sensor only of FIG. 1A in the time and the frequency domains respectively in an environment with minimal ambient noise.

FIGS. 7 and 8 illustrate block diagrams for processing the single channel audio input according to a first solution of the first embodiment of these teachings shown by example at FIGS. 1A-B, according to exemplary embodiments of these teachings.

FIGS. 9A-B and 10A-B show experimental results from the first solution (without applying the optional module in FIG. 8) of the single channel configuration (FIGS. 1A-B) in the time and the frequency domain, respectively.

FIG. 11 illustrates a block diagram for processing the single channel audio input according to a second solution of the first embodiment of these teachings shown by example at FIGS. 1A-B, according to exemplary embodiments of these teachings.

FIGS. 12A-B and 13A-B show experimental results from the second solution of the single channel configuration (FIGS. 1A-B) in the time and the frequency domain, respectively.

FIGS. 17A-B and 18A-B show experimental results from the first solution (FIG. 16A-B) of the second embodiment/dual-channel configuration (FIG. 14A-B) in the time and the frequency domain, respectively.

FIGS. 20A-B and 21A-B show experimental results from the second solution (FIG. 19A-B) of the second embodiment/dual-channel configuration (FIG. 14A-B) in the time and the frequency domain, respectively.

FIGS. 24A-B and 25A-B show experimental results from the diagram of FIG. 23 in the time and the frequency domains, respectively.

DETAILED DESCRIPTION

Below are detailed three distinct embodiments for utilizing a platform configured to removably rest symmetrically on a user's head such as eyeglasses (including sunglasses), helmets, hats, headbands and the like, for primary use with capturing voice signals from a user wearing the platform. While these are all detailed particularly as being disposed in eyeglasses, that is only one of the possible platforms in which they may be implemented and which is used to explain further particulars of the circuitry and the signal processing. In the first embodiment there is a bone vibration sensor, sometimes termed a 'bone microphone', which is in one embodiment a mechanical vibration to electric transducer and senses vibrations in the skull of the speaker. In the first embodiment these sensed mechanical vibrations are used for the voice signal itself. This is alternatively referred to as a single channel configuration. This single channel configuration differs from other prior art in-the-ear type devices which may pick up vibrations from the user's cheekbone or ear canal, which prior art devices are of course not symmetric about a user's head when worn.

In the second embodiment there is a vibration sensor and also an air microphone disposed in the eyeglasses. The signals from both the vibration sensor and the air microphone are taken as the voice signals. In the third embodiment there are multiple air microphones arranged in a spatial array, and also a vibration sensor which is used differently as compared to the second embodiment, and only to detect the user's voice activities and distinguish those voiced frames from unvoiced frames where the user is not speaking. For the third embodiment, below are also detailed alternatives for the vibration sensor and so it is more generally referred to as a voice activity sensor. Such alternatives include a downward facing camera, an ultrasonic sensor and an infrared sensor, to name a few non-limiting alternatives to the vibration sensor. Multiple laboratory analyses are presented below to show just how effective is the vibration sensor for the various detailed embodiments.

Certain of the exemplary and non-limiting embodiments detailed below present an unobtrusive head-mounted device which laboratory testing has proven to capture clear voice from the wearer for voice communication and speech user interface (UI) in a hands-free, mouth-free, and ear-free manner. The examples below and the related description utilize conventional eyeglasses/spectacles as the structure of the removable head wearable platform but this is simply for clarity of the examples and is not limiting; other types of platforms are noted above.

Figure 1A:
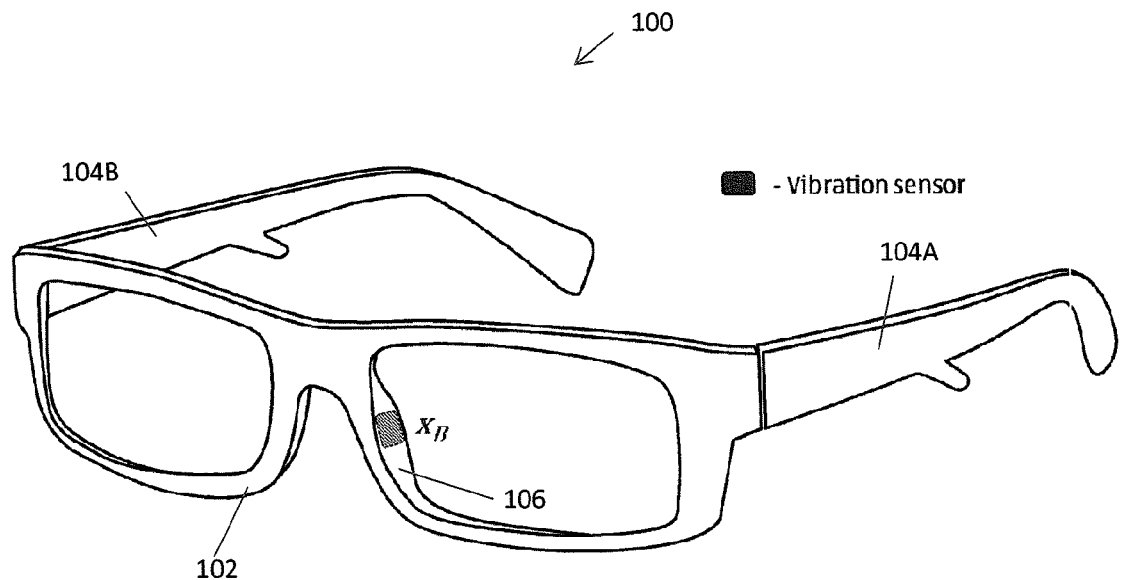
FIGS. 1A-B illustrate two implementations of a first embodiments/single channel configuration of an eyeglass mounted voice capture arrangement according to any exemplary embodiment of these teachings.

FIG. 1A illustrates one embodiment of eyeglasses 100 according to the first embodiment of these teachings. In this first embodiment there is only the vibration sensor mounted on the spectacle frame 100, and the signal from this vibration sensor is wirelessly sent to the user's mobile handset, such as via a Bluetooth link. The signal $x_B(t)$ may be sent directly, or the signal processing described herein may be done in the eyeglass platform itself and the 'system output' signal sent wirelessly to the user's mobile handset for framing, amplification, and transmission over a cellular or other link to the other party of some ongoing voice call.

One implementation of the first embodiment shown at FIG. 1A disposes the vibration sensor $x_B$ in the nose pad 106. Another implementation of the first embodiment shown at FIG. 1B disposes the vibration sensor $x_B$ near the distal end and on the inboard side of one of the spectacle ams is 104A-B. In the FIG. 1B implementation the vibration sensor $x_B$ would lay just behind the ear so as to be in physical contact with the user's skull at the mastoid. Alternatively the vibration sensor $x_B$ may be disposed along one of the arms 104A-B nearer to the front frame 102 so as to contact the user's skull in the temple area. A headband or hat or helmet are effective implementations of the platform with the vibration sensor disposed along the user's temple or forehead.

Figure 4A:
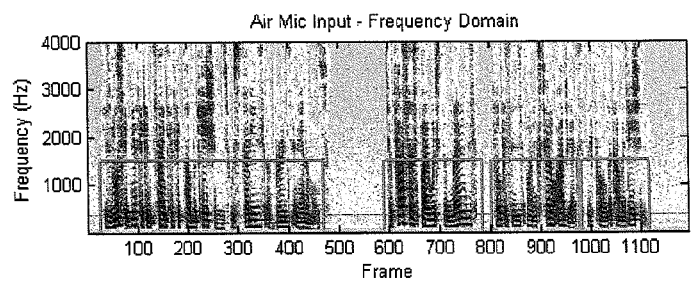
Figure 4B:
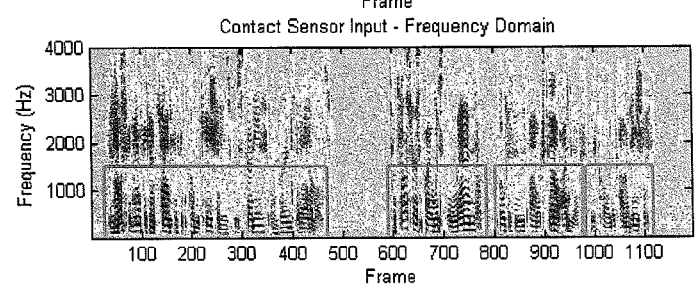
Figure 5A:
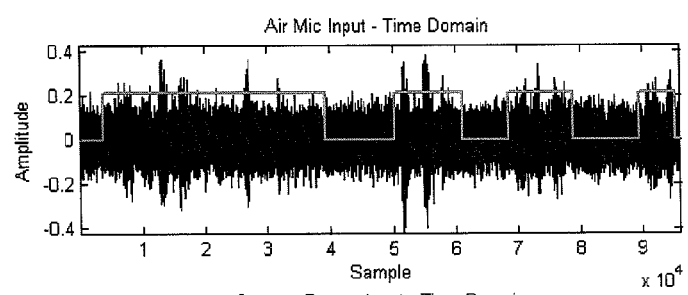
FIGS. 5A-B and 6A-B are similar to FIGS. 3A-B and 4A-B respectively but for a noisy environment.
Figure 5B:
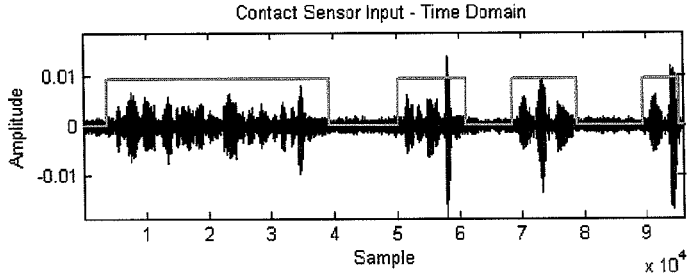
Figure 6A:
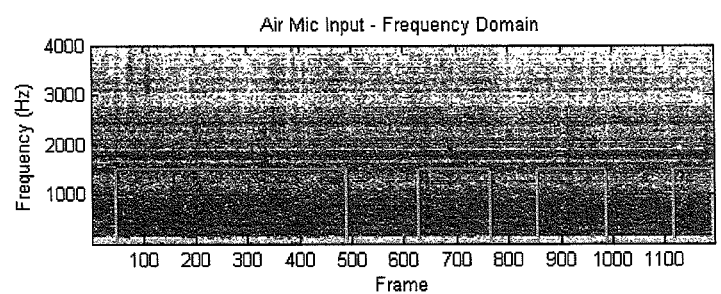
Figure 6B:
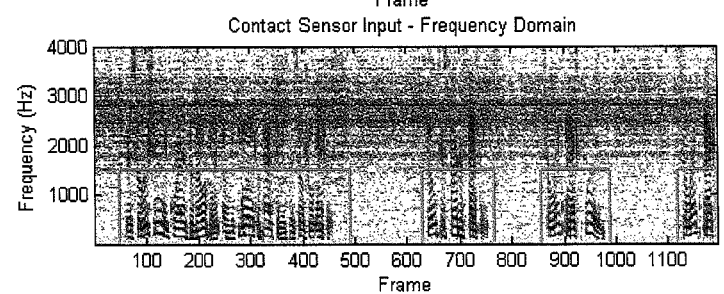

The experimental data collected and presented below utilized resampling to 8 kHz and also high-pass filtered to remove the very low frequencies (below 200 Hz) so as to fit in the standard telephony band. Quantitative experimental results from the FIG. 1A-B single-channel configuration (no air microphone) operating on the auxiliary channel $x_B(t)$ from the vibration sensor $x_B$ are shown at FIGS. 3B and 5B which are in the time domain, and also at FIGS. 4B and 6B which shows results of the same underlying data in the frequency domain. For comparison, FIGS. 3A, 4A, 5A and 6A an input/forward microphone signal from a conventional air microphone configuration such as that of FIG. 2.

Evident in FIGS. 3A through 6B is a digital on/off signal line (see also FIG. 9A) which shows a square wave superimposed over the actual data of the microphone signal, and is relevant for other embodiments which filter voiced frames differently from unvoiced frames.

In the test arrangement for gathering the data of FIGS. 3A-B through 6A-B, as well as for all of the experimental data presented herein, there were eight loudspeakers disposed about an office environment to simulate practical ambient noise environments, including babble, subway, street, etc. Data was collected from different individuals wearing the same testing spectacles to normalize for different voice characteristics, each of whom spoke as if for a normal phone conversation.

Figure 1B:
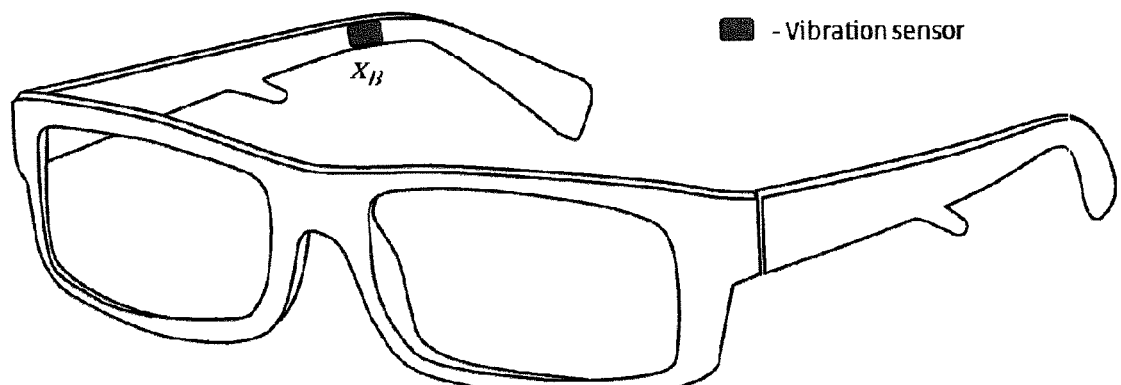

FIGS. 3A-B are in the time domain and represent the signal captured in same recordings by the air microphone $x_A$ alone (representing the conventional single air microphone configuration of prior art FIG. 2) and by the bone microphone $x_B$ alone, respectively, from the FIG. 1A-B arrangement. FIGS. 4A-B are similar results in the frequency domain. All four of these represent sound captured in a quiet environment with little ambient noise to serve as a baseline. FIGS. 5A-B are similar to FIGS. 3A-B, and FIGS. 6A-B are similar to FIGS. 4A-B, but for a noisy environment.

From these four figures the following characteristics of the two different types of microphones becomes clear.

TABLE 1

Comparison between air microphone and vibration sensor for FIG. 9A.

| | Air Microphone | Vibration Sensor |
|---|---|---|
| Advantages | Flat frequency response Wide spectrum | Insensitive to air-conducted sound (The leakage of ambient sound is captured through the spectacles) |
| Disadvantages | Capture "everything" in the air Low sound quality and intelligibility in noisy environments | Rough frequency response (can be solved by equalization) Limited spectrum (but could still meet telephony requirements) Requires larger amplification |

In the quiet environment both types of sensors $x_A$ and $x_B$ are able to capture clear voice, with very high signal-to-noise ratio (SNR). The air microphone $x_A$ outperforms the vibration sensor $x_B$ with a flatter frequency and a wider spectrum. But in the highly noisy environment, the user's voice from the air microphone $x_A$ is completely buried in the ambient noise. Here it can be clearly noticed that the signal captured by the vibration sensor $x_B$ has a higher SNR than that captured by the air microphone $x_A$. In this recording, the SNR of the air microphone $x_A$ input is 4.5 dB, and the SNR of the vibration sensor $x_B$ input is 12.7 dB. Thus the vibration sensor $x_B$ alone provides an 8.2 dB improvement in SNR without any further processing. Although the vibration sensor $x_B$ itself is almost immune to air-conducted sound, it still captures a certain amount of ambient noise through the spectacles due to the frame (and more significantly the lenses) vibrating when sound waves impinge upon them. This SNR improvement can be further improved by the addition of a vibration dampening mechanism between the vibration sensor $x_B$ and spectacle frame; for example foam or flexible adhesive to attach the vibration sensor $x_B$ to the frame.

The vibration sensor $x_B$ has a much higher SNR at lower frequencies, especially below 1500 Hz. The circuit of FIG. 7 exploits this characteristic by applying a low-pass filter (LPF) 702 with the cutoff frequency at 1500 Hz, from which can be obtained a relatively clear voice signal. The LPF 702 can be imposed in conjunction with the optional module 800 shown at FIG. 8. The low-pass filtering may be performed in the time domain with a simple finite impulse response (FIR) filter. But for ready comparison with other experimentation results the LPF 702 was implemented in the frequency domain by setting the value of corresponding frequency bins to zero. In this case the system output using FIG. 7 had an SNR at 24.0 dB, which means an improvement of 19.5 dB over a conventional air microphone input, but at some sacrifice of sound quality. The voice is of course band limited to below 1500 Hz, but its intelligibility was still acceptable.

Improved performance can be obtained by employing an optional module 800 shown more particularly at FIG. 8. The low pass filtering 702 was again performed in the frequency domain to facilitate further processing. The additional processing in FIG. 8 over the bare LPF 702 of FIG. 7 includes an artificial bandwidth extension (ABE) block 806 which takes as its input the output signal of a voice activity detector 804. The voice activity detector 804 distinguishes the voiced frames from the unvoiced frames, which the vibration sensor $x_B$ distinguishes easily since it is not susceptible to ambient noise (though it is noted below that there might be some ambient vibration noise from vibrations of the eyeglass lenses or frame). The concept of artificial bandwidth extension is the focus of ongoing research by Nokia, Oy (the assignee of the rights herein), as well as other companies. For completeness FIG. 8 also illustrates a framing/discrete Fourier transform block 802 to put the input time-domain signal into the frequency domain, and an overlap/add block 808 following the bandwidth expansion block 306 to turn the signal back into the time domain. If the LPF 702 is implemented in the time domain the output of the LPF 702 will feed the discrete Fourier transform (DFT) 802, else the LPF 702 can be implemented directly in the frequency domain by setting the value of corresponding frequency bins to zero after the DFT 802.

Quantitative experimental results from the FIG. 1A-B single-channel configuration (no air microphone) operating on the signal $x_B(t)$ from the vibration sensor $x_B$ are shown at FIG. 9B which is in the time domain, and 10B which shows results of the same underlying data in the frequency domain. For comparison, FIGS. 9A and 10A show an input/forward microphone signal from a conventional air microphone configuration such as that of FIG. 2, whereas FIGS. 9B and 10B show the system output z(t) from the vibration microphone $x_B$ of FIGS. 1A-B.

Evident in FIGS. 9A-B is a digital on/off signal line 902 labeled at FIG. 9A, which like that in FIGS. 3A through 6B shows a square wave 902 superimposed over the actual data of the microphone signal. Vertical transitions of that square wave distinguish the voiced frames 904 from the unvoiced frames 906 which are considered to be noise only.

FIG. 11 illustrates a second circuit for the first embodiment (single channel) of FIGS. 1A-B, as an alternative to the circuit of FIGS. 7-8. The signal $x_B(t)$ from the vibration sensor $x_B$ is input to a framing/DFT block 1102, and the voice activity detector 1104 and overlap/add 1108 blocks are similar to those shown and described with respect to FIG. 8. The voice activity detector block 1104 separates the voiced signal from the unvoiced (noise-only) frames. The voice activity detector 1104 can be implemented in either the frequency domain as shown at FIG. 11 or directly in the time domain in an alternative circuit arrangement. In only the noise-only frames the noise profile (the estimated noise spectrum) is updated at update block 1106. In all frames, voiced and unvoiced/noise-only, spectral subtraction is performed at subtraction block 1107 to remove the noise spectrum output from the update block 1106. After the overlap-add process 1108 the data is transformed back into the time domain to form the output.

Experimental results from the FIG. 1A-B single-channel configuration using the circuitry of FIG. 11 operating on the signal $x_B(t)$ from the vibration sensor $x_B$ are shown at FIGS. 12B (time domain) and 13B (frequency domain). For comparison an input/forward air microphone signal is shown at FIGS. 12A (time domain) and 13A (frequency domain) for the conventional air microphone configuration of FIG. 2, and the system output z(t) is shown at FIGS. 12B and 13B. The square wave shows the voiced versus the unvoiced frames as noted earlier.

The circuit of FIG. 11 provides a system output with a 20.5 dB SNR, which is a 16.0 dB improvement over a conventional air microphone input. Though this improvement is less than that provided by the circuit of FIG. 7, it offers better sound quality because it preserves some of the high frequency components of the voice. The spectral subtraction method used in this case is not too complex, but with further complex processing such as for example Attenuation Limited Wiener Estimation (ALWE) noise filtering, which is ongoing research by Nokia, Oy (the assignee of the rights herein), the signal to noise ratio SNR and sound quality could be increased even further.

Figure 14A:
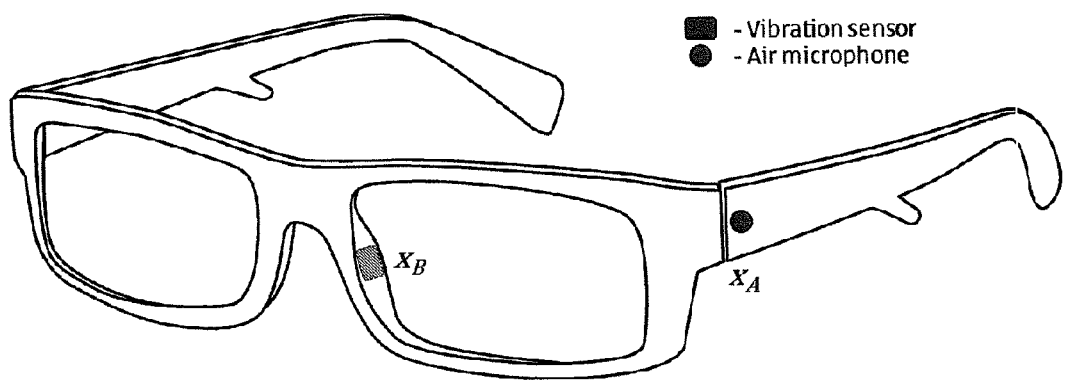
FIGS. 14A-B extend FIGS. 1A-B for a second embodiment/dual channel configuration with one vibration sensor and one air microphone capturing a user's voice according to another aspect of these teachings.
Figure 14B:
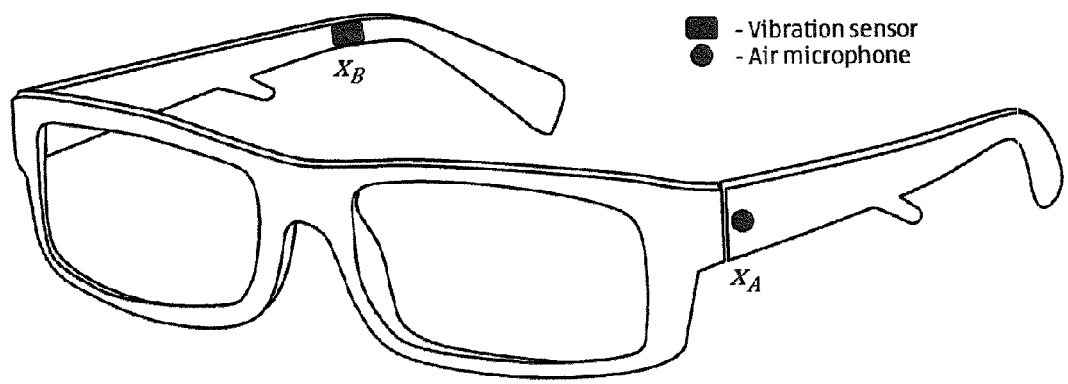

In the first embodiment of FIGS. 1A-B there was a single vibration sensor. This is expanded in the second embodiment the eyeglasses incorporate an additional air conduction microphone $x_A$ which operates with the bone vibration sensor $x_B$ as dual channels from which the output voice signal is derived. This second embodiment also can be implemented on spectacles, sports helmets, headbands, and other such head-mounted devices. FIGS. 14A-B illustrate two exemplary but non-limiting locations for these two sensors which drive the auxiliary channel for the second embodiment in which there is both an air conduction microphone $x_A$ and a bone vibration sensor $x_B$ in the eyeglasses. This second embodiment may be considered a dual channel configuration.

FIGS. 14A-B illustrate exemplary placements for the bone microphone $x_B$ (same as shown at FIGS. 1A-B) and with an additional air microphone $x_A$ for this second embodiment. Alternatively, the vibration sensor $x_B$ could be installed on the inboard side of one arm 104A, 104B nearer the front face to contact the user's temple, but this placement is more effective with a helmet or headband type of platform instead of eyeglasses. For a helmet or headband type of platform, the user's forehead is another effective location.

Now consider a more quantitative treatment of the second embodiment as shown in FIG. 14A where inputs from both the vibration sensor $x_B$ and from the air microphone $x_A$ are used to generate the output. As noted above, two solutions are presented for this second embodiment/dual-channel configuration, both of which are based on the following time domain system modeling:

$$x_A(t)=a(t)+n_A(t) \quad [1]$$

$$x_B(t)=b(t)+n_B(t)+n_e(t) \quad [2]$$

where $x_A(t)$ and $x_B(t)$ are the signal observed by the air microphone and the vibration sensor, respectively. The signal a(t) represents the clean voice content captured by the air microphone, and $n_A(t)$ represents the ambient noise content. Correspondingly, b(t) and $n_B(t)$ represent the clean voice and the ambient noise content picked up by the vibration sensor $x_B$, respectively. The electronic noise content in the air microphone $x_A$ is ignored due to its high SNR level on self-noise, but the corresponding content in the vibration sensor $x_B$ cannot be ignored and is represented by $n_e(t)$.

Turning the system into the frequency domain yields:

$$X_A(\omega) = A(\omega) + N_A(\omega) \quad [3]$$

$$X_B(\omega) = B(\omega) + N_B(\omega) + N_e(\omega) \quad [4]$$

where capital letters represent the Fourier transforms of the corresponding lowercase time-domain signals. Since $A(\omega)$ and $B(\omega)$ are both clean voice contents from the user, there exists an "equalizing transfer function" between them, which is $H(\omega) = A(\omega)/B(\omega)$. Then equation [4] can be written as:

$$X_B(\omega) = H^{-1}(\omega)A(\omega) + N_B(\omega) + N_e(\omega) \quad [5]$$

If we define $x_B'(\omega) = X_B(\omega) N_e(\omega)$, then equation [5] can be written as:

$$H(\omega)X_B'(\omega) = A(\omega) + H(\omega)N_B(\omega) \quad [6]$$

Defining $$\beta(\omega) = \frac{N_B(\omega)}{N_A(\omega)},$$

a transfer function on the ambient noise content, and) $\alpha(\omega) = H(\omega)\beta(\omega)$, then equation [6] can be written as:

$$H(\omega)X_B'(\omega) = A(\omega) + \alpha(\omega)N_A(\omega) \quad [7]$$

Figure 15A:
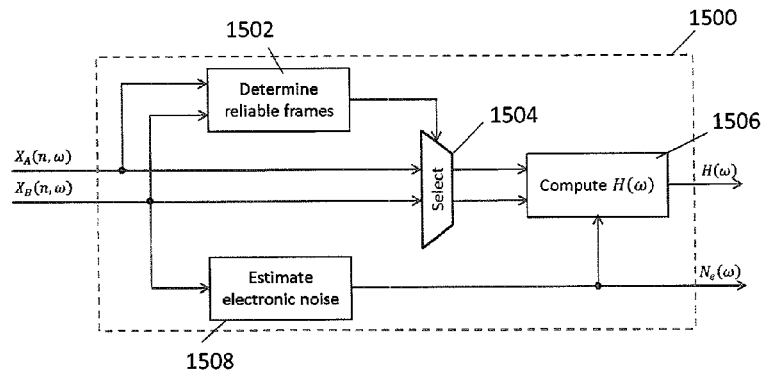
FIGS. 15A-B are functional modules used in further Figures which demonstrate the first and second solutions for the second embodiment/dual-channel configuration of FIG. 14A-B according to these teachings.
Figure 15B:
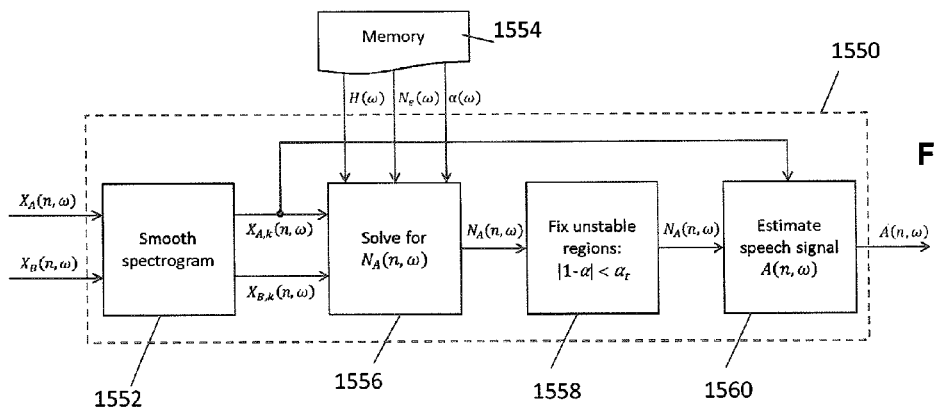

FIGS. 15A-B are function modules 1500, 1550 which solve the above equations and which are used in the first and second solutions for the second dual-channel configuration (FIG. 14A). Both modules work in the frequency domain and take $X_A(n,\omega)$ and $X_B(n,\omega)$ as inputs. The frame number n is added into the input signals $x_A(\omega)$ and $x_B(\omega)$ because they are obtained by framing and DFT.

When a voice recording is done in a quiet environment, both $N_A(\omega)$ and $N_B(\omega)$ are close to zero and so equation [3] and [5] can be simplified as:

$$X_A(\omega) = A(\omega) \quad [8]$$

$$X_B(\omega) = H^{-1}(\omega)A(\omega) + N_e(\omega) \quad [9]$$

From equations [8] and [9] the transfer function $H(\omega)$ and the sensor electronic noise $N_e(\omega)$ can be directly computed, using the general block diagram shown at the module 1500 of FIG. 15A. At each frequency $\omega$, a frame selector 1502, 1504 determines and chooses reliable frames in $X_A(n,\omega)$ and $X_B(n,\omega)$ to minimize the effect of interference such as electronic noise, aliasing, etc. In one non-limiting example the set of reliable frames is derived as follows:

Determine voiced frames at block 1502.

Pick the highest 10% of $x_A(n,\omega)$ and $x_B(n,\omega)$ in amplitude among those.

Select the frames that happen to be in both categories at block 1504. If the number of mutual frames are too low (for example, less than 30), then relax the percentile constraint to allow more frames.

Block 1506 then uses the above reliable frames to compute $H(\omega)$ by $$H(\omega) = \frac{\sum X_A(n,\omega)}{\sum (X_B(n,\omega) - N_6(n,\omega))}.$$

And in $x_B(n,\omega)$, an estimator block 1508 determines unvoiced frames, which yields an estimate of $N_e(\omega)$.

FIG. 15B shows a block diagram of an alternative way to solve the above equations. This module 1550 uses Equation [3] and [7] to solve for ambient noise content $N_A(\omega)$, and then the voice content $A(\omega)$ in the input from the air microphone $x_A$, of which the estimate is denoted by $A(n,\omega)$. After the transfer function $H(\omega)$, noise $N_e(\omega)$, and $\alpha(\omega)$ have been obtained in a separate training process (see FIG. 19A below) and stored in a local memory 1554, the general process of the FIG. 15B module is:

Smooth $x_A(n,\omega)$ and $x_B(n,\omega)$ at block 1552 by averaging each of them with the corresponding k previous frames, i.e., $$X_{A,k}(n,\omega) = \frac{\sum_{i=0}^{k} X_A(n-i,\omega)}{k+1} \text{ and}$$

$$X_{B,k}(n,\omega) = \frac{\sum_{i=0}^{k} X_B(n-i,\omega)}{k+1}.$$

Solve for $N_A(n,\omega)$ at block 1556 using $$N_A(n,\omega) = \frac{X_{A,k}(n,\omega) - H(\omega)(X_{S,k}(n,\omega) - N_6(\omega))}{1 - \alpha(\omega)}.$$

For unreliable $\alpha$ (when $|1-\alpha| < \alpha_r$, where $\alpha_r$ is a threshold), $N_A(n,\omega)$ is obtained by interpolating from its reliable neighbors at block 1558.

Estimate $A(n,\omega)$ at block 1560 using $A(n,\omega) = X_{A,k}(n,\omega) - N_A(n,\omega)$.

Figure 16A:
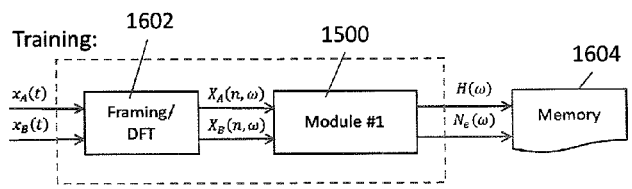
FIGS. 16A-B illustrate block diagrams according to a first solution for the second embodiment/dual-channel configuration (FIG. 14A-B) according to an exemplary embodiment of these teachings.
Figure 16B:
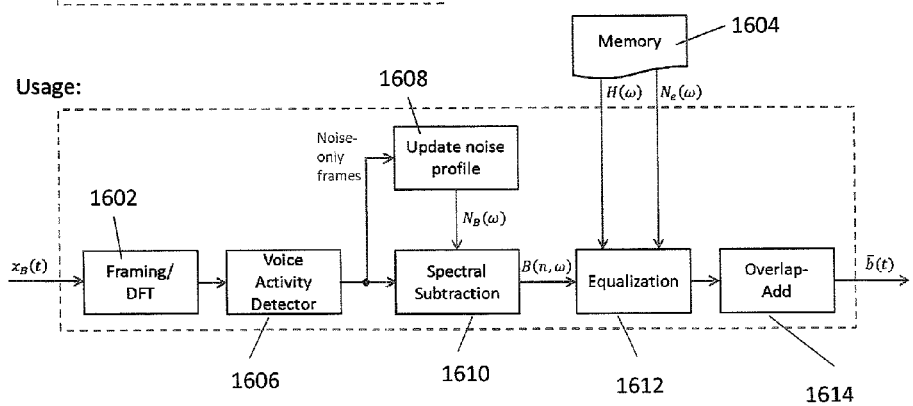

The two solutions for the second configuration (FIG. 14A-B) take advantage of the modules 1500 (FIG. 15A) and 1550 (FIG. 15B). Both these solutions require a short training step, which utilizes module 1500 (FIG. 15A) in different ways. First consider the training step which is shown at FIG. 16A, and with FIG. 16B representing the diagram in operation after training. The equalizing transfer function $H(\omega)$, generated by the additional air microphone $x_A$ and the training step, is applied after the spectral subtraction stage 1610 (FIG. 16B). So in the training stage of FIG. 16A the process changes into:

Record the user's voice in a quiet environment.

Frame both sensor inputs and do DFT at block 1602.

Apply Module 1500 (FIG. 15A).

Store $H(\omega)$ and $N_e(\omega)$ to the memory 1604.

Once the training stage is complete and the initial transfer function $H(\omega)$ and noise $N_e(\omega)$ are stored, operation in practice for the first solution of the second configuration follows FIG. 16B:

Frame the vibration sensor input and do DFT at block 1602.

Send the data into VAD 1606, which separates the voiced and noise-only frames.

In those noise-only frames, update the noise profile (estimated noise spectrum) at block 1608.

In all frames, perform spectral subtraction at block 1610 to remove the noise spectrum.

Apply the equalizing transfer function from the memory 1604 on the data at block 1612.

Apply an overlap-add process at block 1614 and transform the data back into the time domain to form the output.

The training step of FIG. 16A could be either pre-programmed or during the daily use. For the pre-programmed option the manufacturer can store a set of equalizing transfer functions in the device and allow the user to choose the one that offers the best sound quality. For the at-use training option, when the user is speaking the air microphone $x_A$ can detect the ambient sound level. Once it is below a certain level for a certain period of time, meaning that the environment is quiet, the training process would start automatically. Furthermore, since the air microphone $x_A$ is only used in the training step, in practice the device could offer two modes: "noise-free" ($x_B$ only) and "all-in" ($x_A$ only), in which the user is then free to choose either of them.

The results from FIG. 16B are presented at FIGS. 17A-B (time domain) and 18A-B (frequency domain). FIGS. 17A and 18A give the signal from the air microphone $x_A$ (representing the conventional single air microphone configuration shown at FIG. 2) and FIGS. 17B and 18B give the system output. This embodiment generated an output with 25.2 dB SNR, which means an improvement of 20.7 dB over the $x_A$ input. Comparing FIGS. 17B and 18B with FIGS. 12B and 13B from the single channel configuration, the transfer function H(ω) not only brings in another 5 dB improvement in SNR but also amplifies the voice frequencies, thus improving the overall sound quality as shown by comparing those figures.

Figure 19A:
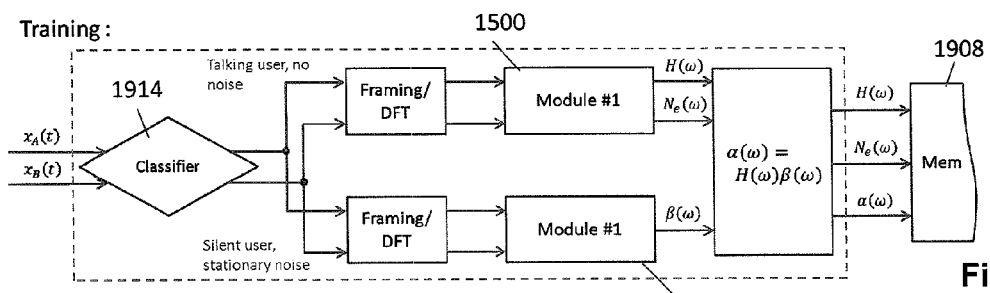
FIGS. 19A-B illustrate block diagrams according to a second solution for the second embodiment/dual-channel configuration (FIG. 14A-B) according to an exemplary embodiment of these teachings.

The block diagram to implement the second solution for the dual channel configuration is shown at FIGS. 19A (training) and 19B (usage). The training step in this solution uses recordings in two different sound environments: speaking in a quiet field and silence in a highly noisy field. The training procedure for FIG. 19A is then as follows:

When the user is speaking in a quiet environment (upper branch of FIG. 19A), apply Module 1500 (FIG. 15A), and compute H(ω) and $N_e(ω)$.

When the user is silent with a high-amplitude background noise (lower branch of FIG. 19A), apply Module 1500 (FIG. 15A), and compute the noise transfer function β(ω).

Compute α(ω) at block 1906 and store it to the memory 1908 together with H(ω) and $N_e(ω)$.

Usage:

Frame both sensor inputs and do DFT at block 1902.

Send the data into voice activity detector 1904, which separates the voiced and noise-only frames.

Apply Module 1550 (FIG. 15B).

Further enhance the spectrum by smoothing at block 1910.

Apply overlap-add process at block 1912 and transform the data back into time domain to form the output.

Similar with the solution of FIGS. 16A-B, data from the training step could be either pre-installed or generated during the user's daily use. For the at-use training, the air microphone $x_A$ can classify the sound environments at block 1914 and enable/disable the training automatically, or alternatively the user could manually control it and start/stop the training when he/she feels it might be necessary.

Figure 19B:
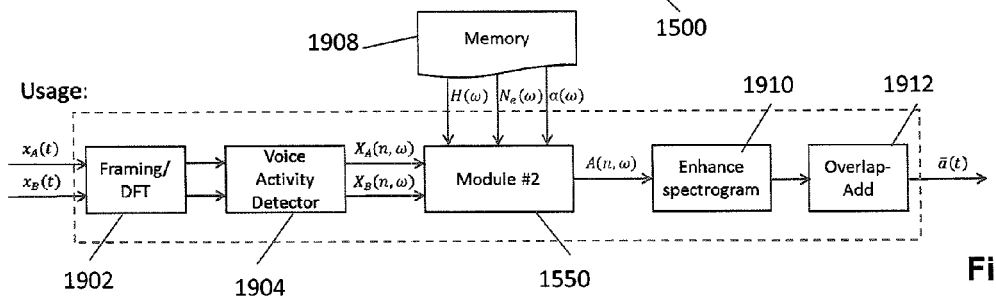

The results from FIG. 19B are presented at FIGS. 20A-B (time domain) and 21A-B (frequency domain). FIGS. 20A and 21A give the signal from the air microphone $x_A$ (representing the conventional single air microphone configuration) and FIGS. 21B and 21B give the system output which has an SNR at 27.4 dB. That is a 22.9 dB improvement over the raw air microphone signal $x_A$.

Table 2 below shows the SNR improvement results from the first and second solutions for both the first embodiment (FIGS. 1A-B) and the second embodiment (FIGS. 14A-B) detailed above. Other multi-channel noise reduction technologies and acoustical treatments can also be applied to improve the performance.

TABLE 2

Performance comparison of the 4 solutions in SNR improvement

| | Air | Contact | Single channel | | Dual channel | |
| --- | --- | --- | --- | --- | --- | --- |
| | Microphone $x_A$ | Sensor $x_B$ | Solution #1 | Solution #2 | Solution #1 | Solution #2 |
| SNR (dB) | 4.5 | 12.7 | 24.0 | 20.5 | 25.2 | 27.4 |
| SNRI (dB) | 0 | 8.2 | 19.5 | 16.0 | 20.7 | 22.9 |

Figure 22A:
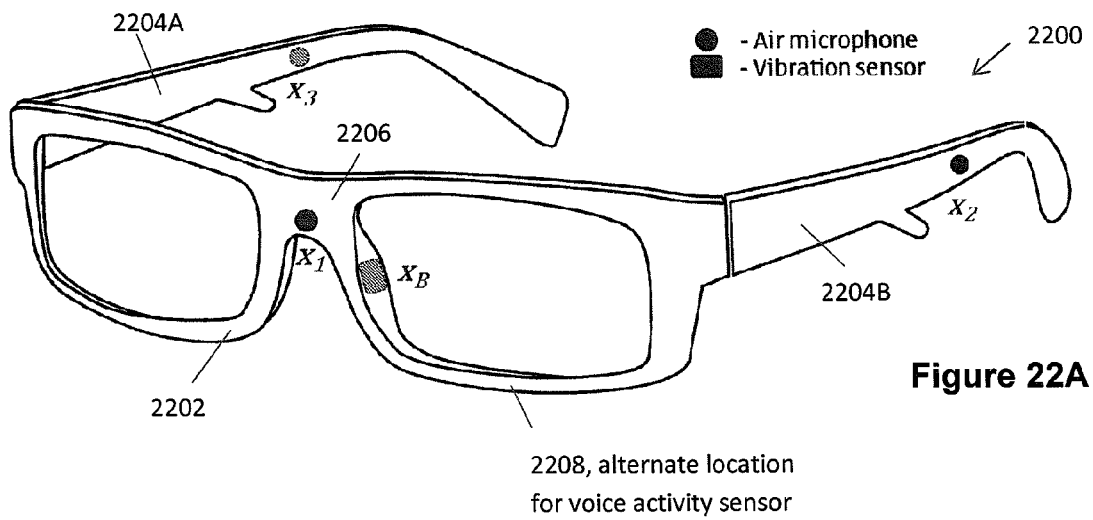
FIG. 22A is a perspective view of spectacles with three microphones and a nose-mounted vibration sensor with the microphones capturing a user's voice in a third embodiment/multi-channel configuration according to an exemplary embodiment of these teachings.
Figure 22B:
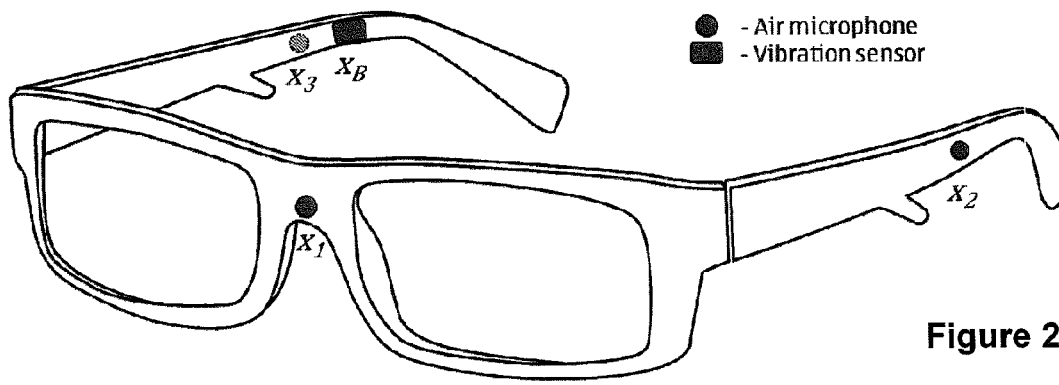
FIG. 22B is similar to FIG. 22A but with the vibration sensor mounted on the spectacle arm above the user's ear.

Now is described the third embodiment which is shown by example at FIGS. 22A-C as implemented in eyeglasses 2200. In this third embodiment there are two different types of sensors mounted on the spectacle frame 2200. Specifically, FIG. 22A includes three air microphones and one vibration sensor in the eyeglasses 2200 or other platform. The vibration sensor is in one embodiment a mechanical vibration to electric transducer as with FIGS. 1A-B and FIGS. 14A-B. The vibration sensor may be considered more generally as a voice activity sensor in this third embodiment, and therefore could be a simplified version of the sensor used in previous embodiments. Another implementation of that is a downward facing camera to detect when the user's lips are moving, disposed for example along the underside of one or both eyepiece portions of the front frame 2202 at the illustrated alternate location 2208. Other embodiments of the voice activity sensor is an ultrasonic sensor or an infrared sensor.

Air microphone $x_1$ is at the center of the front frame 2202 on the bridge 2206 and above the user's nose when the spectacles are worn. Air microphones $x_Z$ and $x_B$ are each on opposed spectacle arms 2204A, 2204B, directly above the user's ears when the spectacles are worn. Other embodiments detailed further below may have only one air microphone mounted along one of the arms 2204A, 2204B in addition to the air microphone mounted at the front frame 2202; or still further embodiments may employ multiple microphones along the front frame 2202.

The vibration sensor $x_B$ is installed in the nose pad 2206 in the FIG. 22A embodiment, similar to FIG. 1A. Or in another implementation of this third embodiment shown at FIG. 22B, the vibration sensor $x_B$ may be disposed along the inboard side of one of the spectacle arms 2204A-B near the distal end and adjacent to the user's ear similar to that shown in FIG. 1B so as to be in physical contact with the user's skull at the mastoid.

In the embodiments for other types of head-mounted devices, such as headbands and helmets, the air microphones could remain at the same locations as shown for FIGS. 22A-B, and the vibration sensor $x_B$ could be deployed on the user's forehead, which is an ideal location for bone conducted voice pickup. For a helmet the primary voice microphone(s) $x_1$ may be deployed along the underside of the lip running across the user's forehead. In other spectacle embodiments, the primary voice microphone $x_1$ may be disposed along the underside of the front frame 2202 beneath the eyepiece, or two may be so deployed with one under each eyepiece.

For any of the implementations at FIGS. 22A-B, air microphone $x_1$ is placed closest to the user's mouth to serve its primary purpose of capturing the user's voice. Of course the signal from this microphone $x_1$ would still be corrupted by ambient noise that may be present. The primary purpose of microphones $x_Z$ and $x_B$ is to capture ambient noise, which is the reason for their location away from the user's mouth which helps assure the signals which they capture and output are predominantly noise.

Figure 23:
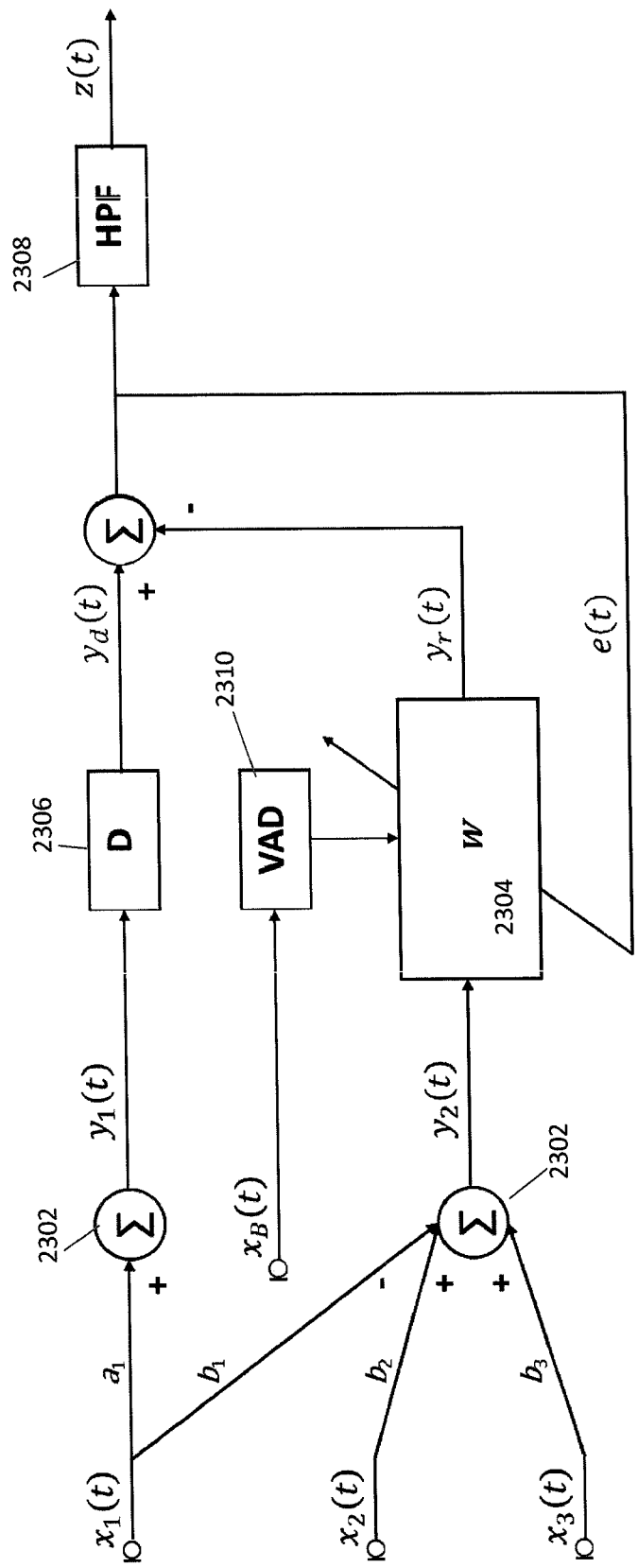
FIG. 23 is a schematic block diagram for processing the signals received at the spectacles of FIGS. 22A-C according to an exemplary embodiment of these teachings.

Linear combinations of these three air microphone inputs form the two data channels for signal processing as is shown by the block circuit diagram of FIG. 23, which is an exemplary noise cancellation circuit 2300 though it may be implemented by a tangibly embodied signal processing software program. There is also a third (auxiliary) channel input to that circuit from the vibration sensor $x_B$ which detects the vibration in the skull generated by the user's speaking activity Four signals are input to the circuit 2300 of FIG. 23. A forward microphone signal $x_1(t)$ is from the microphone $x_1$ mounted on the front frame 2202; two lateral microphone signals $x_2(t)$ and $x_3(t)$ are from the respective microphones $x_Z$ and $x_B$ mounted on either of the spectacle arms 2204A-B, and a contact signal $x_B(t)$ is input from the vibration sensor $x_B$ or is the signal combined from multiple such sensors These are manipulated in the noise reduction circuit 2300 which is a modified adaptive interference canceller (AIC), having an adaptive filter w as its kernel (reference #2304). The input signal $x_1(t)$ from the forward microphone $x_1$ is weighted at a combiner 2302 to form a primary channel $y_1$:

$$y_1(t)=a_1x_1(t) \quad [10]$$

The three microphone signals $x_1(t)$, $x_2(t)$, and $x_3(t)$ are also combined at a combiner 2302 and the weighted difference between them forms a secondary channel $y_2(t)$, which may be considered as a noise reference channel:

$$y_2(t)=b_2x_2(t)+b_3x_3(t)-b_1x_1(t) \quad [11]$$

Then the noise reference channel $y_2(t)$ is fed into the adaptive filter w and processed to match the noise contained in the primary channel $y_1(t)$ as close as possible. The output of the adaptive filter w is then a filtered noise $y_r(t)$ which in the ideal represents noise in the primary channel $y_1(t)$. There are various algorithms known in the art which can be used to implement the adaptive filter w, including but not limited to least mean squares (LMS), recursive least squares (RLS), etc. The inventors' experiments have found that normalized least mean squares (NLMS) works quite effectively as the error criterion.

The filtered noise $y_r(t)$ is then subtracted from the primary channel $y_1(t)$, as delayed $y_d(t)$ by block 2306 to account for processing delay in the adaptive filter w so as to match in time the filtered noise channel $y_r(t)$ to the delayed primary channel $y_d(t)$. In this manner the noise component is canceled from the primary channel $y_1(t)$, ideally leaving only the user's voice signal which was captured at the microphone $x_1$ mounted on the front frame 2202. But the cancellation is not ideal in a practical system and so the result from the combiner that follows the delay block 2306 is termed an error signal, obtained as:

$$e(t)=y_d(t)-y_r(t) \quad [12]$$

This error signal e(t) is then applied to two branches. One branch is immediately fed back into the adaptive filter w. The other branch is input to a high-pass filter (HPF) 2308 whose output forms the final output z(t). While it is an error signal for the adaptive filter w, in fact it represents the voice signal captured at the microphone $x_1$ with some of the ambient noise removed; it is error only so far as some noise might still remain, thus the final output z(t). The HPF 2308 is not required in all implementations, but is applied to remove the low frequency components outside the regular telephone audio band. The HPF 2308 may be implemented to also filter out part of the noise residue and even improve the performance.

An important part of the overall system is the contact signal $x_D(t)$ from the vibration sensor $x_B$, which is input into a voice activity detector (VAD) 2310. The vibration sensor $x_B$ is a bone microphone and so it only picks up vibrations from the user's skull and thus its signal is free of ambient sound. Though its sound quality is not as good as a regular air microphone, its purpose is to detect precisely when the user is vocalizing. The similar principle is in effect when the voice activity sensor is implemented as a downward facing camera or a motion detector; it identifies those frames in which the user is talking.

Since the adaptive filter 2304 would not converge if the target signal (speech) and the interfering signal (noise) exist simultaneously, it can only adapt during noise-only periods. Therefore, the VAD 2310 operates as a switch to suspend the filter 2304 adaptation as soon as the user starts speaking, and to enable the filter 2304 to continue adapting in the unvoiced frames when he/she is not speaking. During the suspension periods, the filter w will be fixed to the final value from the last adaptation iteration. As noted above, the vibration sensor $x_B$ is not the only way to implement the VAD switching of filter adaptation; other types of sensors can be used such as for example a downward facing camera or a motion detector mounted on the front frame 2202 to detect facial movement during speech. In general these and other implementations may be referred to more generally as voice activity sensors, distinguished from conventional over-the-air microphones in that voice activity sensors are immune to ambient noise.

Ideally, after the adaptive filter r converges the additive noise in the primary channel $y_1(t)$ would be completely removed by the subtraction, and therefore the system output z(t) would be completely noise-free. One effective measure of the system's performance is signal-to-noise ratio improvement (SNRI), which is the difference between the output SNR and the input SNR. This is shown at FIGS. 24A-B and 25A-B.

The data for FIGS. 24A-B and 25A-B were gathered from experiments directed toward evaluating the performance of an apparatus somewhat similar to that shown at FIG. 22A, except the experimental spectacles had five omni-directional air microphones on the frame rather than three. The test apparatus for the data of FIGS. 24A-B and 25A-B had three air microphones mounted at the locations shown at FIG. 22A and two additional microphones mounted to the spectacles near the front end of the spectacle arms 2204A, 2204B near the user's temples, with one additional air microphone on each arm 2204A, 2204B. One of these additional air microphones was used to capture a reference channel, representing the conventional single-microphone configuration for head-mounted voice capture such as at FIG. 2. In the test arrangement there were eight loudspeakers disposed about an office environment to simulate practical ambient noise environments, including babble, subway, street, etc. Data was collected from different individuals wearing these testing spectacles to normalize for different voice characteristics, each of whom spoke as if for a normal phone conversation.

The output of the experimental system is compared with that of the conventional single-microphone setup of FIG. 2 having only one air microphone disposed on the left spectacle arm. FIGS. 24A and 25A give results for the single-microphone reference (FIG. 2), while FIGS. 24B and 25B give results for the tested spectacles which utilized the vibration sensor $x_B$, three air-microphones shown at FIG. 22A, and filter adaptation using the VAD 2310. FIGS. 24A and 24B show the comparison in the time domain, while FIGS. 25A and 25B show the same underlying data compared in the frequency domain.

Evident in FIGS. 24A-B is a digital on/off signal line 2402 labeled at FIG. 24A, which is generated by the VAD 2310 and is superimposed as the square wave over the actual data of the microphone signal. Vertical transitions of that VAD signal line 2402 divide the microphone signal into voiced 2404 and unvoiced (noise-only) 2406 sections, those sections being specifically labeled at FIG. 24B. In this evaluation the experimental implementation of the inventive spectacles reached roughly 18 dB in SNRI. This was only a proof of concept evaluation and the basic concept presented at the circuit 2300 of FIG. 23 could be further improved using other multi-channel noise reduction technologies and with more extensive post processing and acoustical treatments.

Figure 26A:
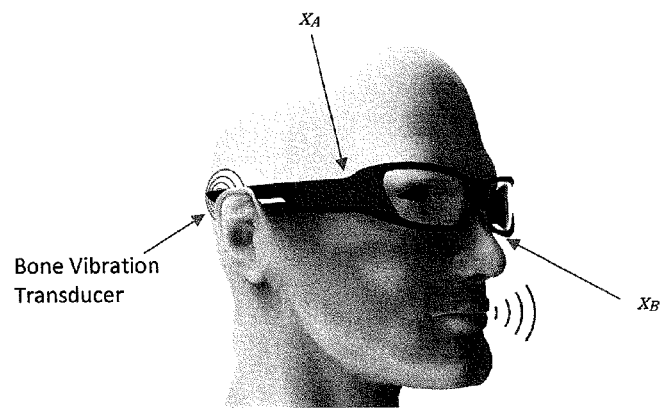
FIG. 26A-B is similar to the embodiment of FIG. 14A but with additionally a vibration transducer mounted to contact a user's skull behind each ear for providing sound to the user for a fully hands free and ear free two way communication device, and further illustrating a simplified block diagram of a mobile terminal to which the head-set platform may be wirelessly linked through Bluetooth or some other personal areas network.
Figure 26B:
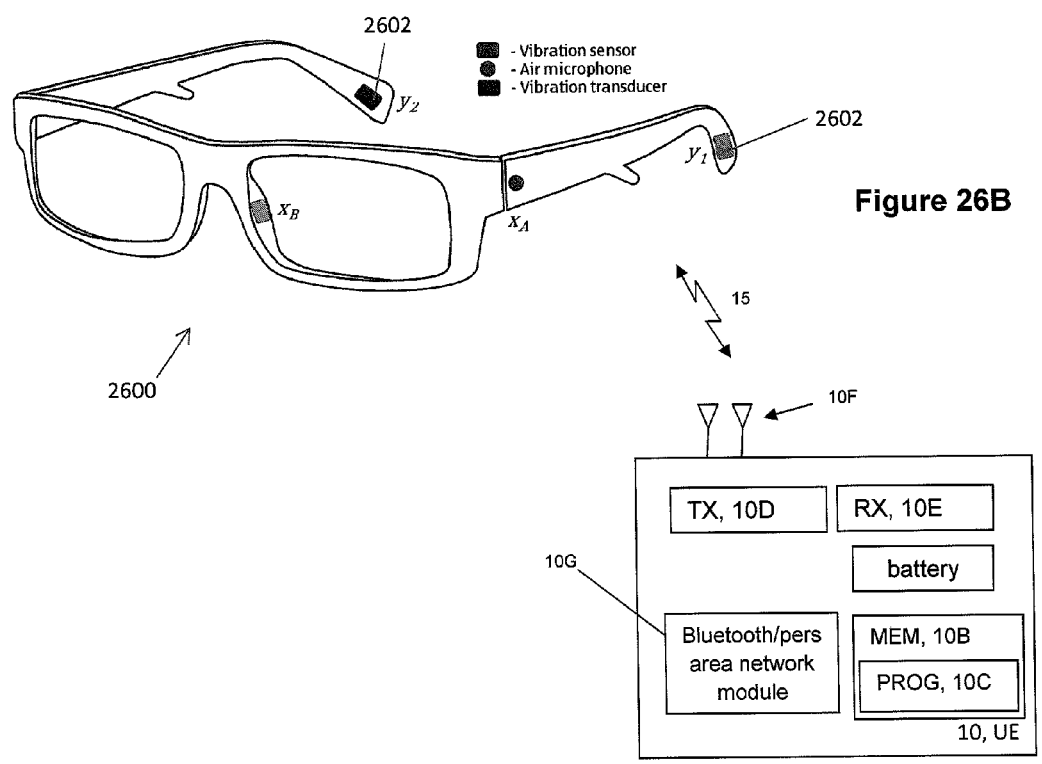

FIG. 26A-B is a perspective view of an example implementation of a two-way (capture & playback) audio spectacles being worn by a user, according to the second embodiment/dual-channel configuration. This is similar to FIG. 14A, except there are additionally two bone vibration transducers 2602 to provide sound from the spectacles to the user, rendering the spectacles a completely ear-free two-way audio interface. In this implementation there is a bone vibration transducer mounted towards the distal ends of each spectacle arm, furthest from the front frame so as to lie in contact with the user's temporal bone portion of the skull, either above the ear (squama temporalis) or behind the ear on the mastoid (pars mastoidea). FIG. 26A-B provides an example solution on how to achieve two-way audio, and the same vibration transducer deployment can be applied to the first and the third embodiment. From the above test results the inventors conclude that the two-way implementation in FIG. 26A-B is the most effective.

For completeness, also shown at FIG. 26B is a schematic block diagram of a user equipment UE 10 for illustrating a mobile terminal to which the head-mounted device 2600 may be in contact via Bluetooth or other personal area network wireless link 15. While only one wireless link 15 is shown there may be more, each representing multiple logical and physical channels.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter 10D and receiver 10E for bidirectional wireless communications over cellular links via one or more antennas 10F (two shown). The UE 10 is also shown as having a Bluetooth module 10G, whose antenna may be inbuilt into the module. While not particularly shown at FIG. 26, the head-set device 2600 also includes a Bluetooth or other personal area network module for wireless communications at short range with the UE 10, as well as a processor/DP and a memory/MEM storing a program/PROG for implementing the circuits and functional blocks detailed above.

More practical deployments would dispose the circuitry and modules detailed above into the head-set device 2600 and only the system output signal is sent wirelessly to the UE 10, but it is possible to send the raw microphone signals to the UE 10 in which the described circuitry and processing blocks are disposed, assuming the wireless link 15 supports more than one bi-directional audio channel At least one of the PROGs in the headset device 2600 or in the UE 10 is assumed to include program instructions that, when executed by the associated DP, enable the device to operate in accordance with the exemplary embodiments of this invention, as detailed above. That is, the exemplary embodiments of this invention may be implemented at least in part by computer software executable by the DP of the UE 10 and/or by the DP of the head-set device 2600, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEM in the UE 10 and in the head-set device 2600 may be of any type suitable to the local technical environment and may be implemented using any suitable data storage technology, such as semiconductor based memory devices, flash memory, magnetic memory devices and systems, optical memory devices and systems, fixed memory and removable memory. The DPs may be of any type suitable to the local technical environment, and may include one or more of general purpose computers, special purpose computers, microprocessors, digital signal processors (DSPs) and processors based on a multicore processor architecture, as non-limiting examples.

Some of the above embodiments may be generalized as follows. There is determined, from at least a first electrical audio signal from a first transducer, voiced frames during which a user is speaking and unvoiced frames during which the user is not speaking. In this case the first transducer is disposed on a platform configured to be removably placed symmetrically on or about a user's head, and the first transducer is further configured to capture vibration of the user's skull or facial movement generated by the user's voice activity and to detect the user's speaking activity. The first electrical audio signal received at the platform is then processed as the voiced frames and/or as the unvoiced frames.

In the first solution for the single channel embodiment, the first electrical audio signal received at the platform is from the first transducer which is a vibration sensor, and the one or more circuitries and/or one or more memories including computer program code processes the voiced frames by low-pass filtering and artificially extending a bandwidth thereof.

In the second solution for the single channel embodiment, the first electrical audio signal received at the platform is from the first transducer which is a vibration sensor, and the one or more circuitries and/or one or more memories including computer program code processes the unvoiced frames as noise-only frames for updating a noise profile and processes the voiced frames by spectrally subtracting the noise profile therefrom.

For the dual or multi channel embodiment, there is further at least a second transducer which is an air microphone, and second audio electrical signals received at the platform are differentially processed by the one or more circuitries and/or one or more memories including computer program code as voiced and unvoiced frames.

In the first solution for the dual channel embodiment, an equalizing function, which is the transfer function between clean voice content captured by the first and the second transducer, is computed by a separate training process of the one or more circuitries and/or one or more memories including computer program code. In this case the one or more circuitries and/or one or more memories including computer program code processes the unvoiced frames as noise-only frames for updating a noise profile obtained only from the first electrical audio signal from the first transducer which is a vibration sensor, and processes the voiced frames by spectrally subtracting the noise profile therefrom and applying the pre-computed equalizing transfer function to enhance the output spectrum.

In the second solution for the dual channel embodiment, two equalizing functions [which are a) the transfer function between the clean voice content captured by the first and the second transducer, and b) a transfer function between ambient noise content captured by the two transducers and an estimate of electronic noise of the first transducer] are computed by a separate training process of the one or more circuitries and/or one or more memories including computer program code. In this case the ambient noise content captured by the second transducer is estimated by utilizing results of the training process. Additionally, the circuitry or embodied software processes the voiced frames to estimate a speech signal by separating therefrom the ambient noise content estimated from the output signals of the second transducer.

For the multi-channel embodiment, the platform comprises at least three air microphones spatially disposed about the platform; and the one or more circuitries and/or one or more memories including computer program code is configured to output an adaptively filtered noise signal from at least inputs from side-mounted ones of the air microphones. This adaptive filtering produces an error signal which remains after subtracting the filtered noise signal from an output signal of a forward-mounted one of the air microphones, and the adaptive filtering is dynamically adaptive only during the unvoiced frames and static during the voiced frames.

As was detailed above, for the multi-channel embodiment the first transducer is one of a vibration sensor, a downward facing camera, an ultrasonic sensor and an infrared sensor. And also in any of the above embodiments the platform comprises one of eyeglasses, sunglasses, a helmet and a headband.

Consider again the above multi-channel embodiments at FIG. 22A-B with the array of three air microphones. While the described vibration sensor may be alternatively implemented as a downward facing camera, an ultrasonic sensor, an infrared sensor, and the like, the air microphone array by itself provides quite a few advantages independent of any voice activity sensor. For example, this array of air microphones can be used to capture high-fidelity directional/surround sound in which the signals of all three air microphones are post-processed by some existing solutions, including the surround sound capture algorithm of Nokia, Oy (the assignee of the rights herein); and can be used for binaural recording in which the signals of only the side-mounted air microphones are post-processed by existing solutions like the binaural recording algorithm of Nokia, Oy (the assignee of the rights herein).

In general, the various exemplary embodiments may be implemented in hardware or special purpose circuits, software, logic or any combination thereof. For example, some aspects may be implemented in hardware, while other aspects may be implemented in embodied firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, embodied software and/or firmware, special purpose circuits or logic, general purpose hardware or controller or other computing devices, or some combination thereof, where general purpose elements may be made special purpose by embodied executable software.

The above embodiments are quite varied and so not all will exhibit the same technical advantages. Some of them such as those described with reference to FIG. 26A-B enable a completely hands-free and mouth-free and ear-free solution for two-way voice communication, and with greatly enhanced voice quality and speech intelligibility for its use in highly noisy environments. In some embodiments this setup is multi-functional; for example the three microphone arrays of FIGS. 22A-B can also be used to do binaural recording. Other embodiments provide some but not all of these technical advantages and may provide other advantages as detailed above for the specific configurations. As already mentioned above, the technology detailed for the eyeglass platform can easily be implemented on other forms of head-mounted devices such as headbands and helmets.

Another advantage of certain of the above examples is that a spectacle-mounted Bluetooth accessory is more likely to be widely adopted and garner wider acceptance than current Bluetooth earpiece/microphone boom arrangements. The head-set mounted multi-microphone platform is flexible enough to offer the potential for multichannel audio technologies to become commercially available in the future, such as for example integrated with a spectacle-based see-through display, gaze tracker, camera, and other types of sensors.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, and circuitry described herein by example.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. An apparatus comprising:
a platform configured to be removably placed symmetrically on or about a user's head;
at least one first transducer configured to capture vibration of the user's skull or facial movement generated by the user's voice activity and to detect the user's speaking activity, wherein the at least one first transducer converts the vibration or facial movement into a first electrical audio signal;
at least one of one or more circuitries and one or more memories including computer program code for processing the first electrical audio signal from the at least one first transducer received at the platform into voiced frames and unvoiced frames, wherein the voiced frames and the unvoiced frames are defined based at least on the first electrical audio signal; and
at least one second transducer, said at least one second transducer being an air microphone, said at least one second transducer producing at least one second electrical audio signal, wherein said at least one second electrical audio signal received at the platform from said at least one second transducer are differentially processed by at least one of the one or more circuitries and the one or more memories including computer program code into voiced and unvoiced frames,
wherein an equalizing function, said equalizing function being a first transfer function based on clean voice content captured by said at least one first transducer and said at least one second transducer, is computed, and wherein at least one of the one or more circuitries and the one or more memories including computer program code processes the unvoiced frames as noise-only frames for updating a noise profile obtained only from the first electrical audio signal from the at least one first transducer, and processes the voiced frames by subtracting the noise profile there from and applying the equalizing function to enhance the output spectrum.

2. The apparatus according to claim 1, wherein the first electrical audio signal received at the platform is from the at least one first transducer, said at least one first transducer being a vibration sensor, and wherein at least one of the one or more circuitries and the one or more memories including computer program code processes the voiced frames by low-pass filtering and artificially extending a bandwidth thereof.

3. The apparatus according to claim 1, wherein the first electrical audio signal received at the platform is from the at least one first transducer, said at least one first transducer being a vibration sensor, and wherein at least one of the one or more circuitries and the one or more memories including computer program code processes the unvoiced frames as noise-only frames for updating a noise profile and processes the voiced frames by spectrally subtracting the noise profile therefrom.

4. The apparatus according to claim 1, wherein said equalizing function is computed by a separate training process of at least one of the one or more circuitries and the one or more memories including computer program code.

5. The apparatus according to claim 1, wherein two equalizing functions, said two equalizing functions being the first transfer function between the clean voice content captured by said at least one first transducer and said at least one second transducer, and a second transfer function between ambient noise content captured by said at least one first transducer and said at least one second transducer and an estimate of electronic noise of said at least one first transducer, are computed by a separate training process of at least one of the one or more circuitries and the one or more memories including computer program code;

wherein the ambient noise content captured by said at least one second transducer is estimated by utilizing results of the training process; and wherein the circuitry or embodied software processes the voiced frames to estimate a speech signal by separating there from the ambient noise content estimated from the output signals of said at least one second transducer.

6. The apparatus according to claim 1, wherein the apparatus further comprises at least three air microphones spatially disposed about the platform; and wherein at least one of the one or more circuitries and the one or more memories including computer program code is configured to output an adaptively filtered noise signal from at least inputs from side-mounted ones of the air microphones, wherein the adaptive filtering produces an error signal, said error signal remaining after subtracting the filtered noise signal from an output signal of a forward-mounted one of the air microphones; and wherein the adaptive filtering is dynamically adaptive only during the unvoiced frames and static during the voiced frames.

7. The apparatus according to claim 6, wherein said at least one first transducer is one of a vibration sensor, a downward facing camera, an ultrasonic sensor and an infrared sensor.

8. The apparatus according to claim 1, wherein the platform comprises one of eyeglasses, sunglasses, a helmet, and a headband.

9. A method comprising:

determining from at least a first electrical audio signal from a first transducer voiced frames indicating when a user is speaking and unvoiced frames indicating when the user is not speaking, wherein the first transducer is disposed on a platform configured to be removably placed symmetrically on or about a user's head and is configured to capture vibration of the user's skull or facial movement generated by the user's voice activity and to detect the user's speaking activity;

processing the first electrical audio signal received at the platform into the voiced frames and the unvoiced frames; and processing a second electrical audio signal received from at least a second transducer disposed on the platform, said second transducer being an air microphone, into voiced and unvoiced frames, wherein an equalizing function, said equalizing function being a first transfer function based on clean voice content captured by the first and the second transducers, is computed, and wherein processing the first and second electrical audio signals comprises processing the unvoiced frames as noise-only frames for updating a noise profile obtained only from the first electrical audio signal, and processing the voiced frames by subtracting the noise profile therefrom and applying the equalizing function to enhance the output spectrum.

10. The method according to claim 9, wherein the first electrical audio signal received at the platform is from the first transducer, said first transducer being a vibration sensor, and wherein processing the first electrical audio signal comprises processing the voiced frames by low-pass filtering and artificially extending a bandwidth thereof.

11. The method according to claim 9, wherein the first electrical audio signal received at the platform is from the first transducer, said first transducer being a vibration sensor, and wherein processing the signals comprises processing the unvoiced frames as noise-only frames for updating a noise profile and processing the voiced frames by spectrally subtracting the noise profile therefrom.

12. The method according to claim 9, wherein said equalizing function is computed by a separate training process.

13. The method according to claim 9, wherein two equalizing functions, said two equalizing functions being the first transfer function between clean voice content captured by the first and the second transducers and a second transfer function between the ambient noise content captured by the two transducers, and an estimate of the electronic noise of the first transducer, are computed by a separate training process;

wherein the ambient noise content captured by the second transducer is estimated by utilizing results of the training process; and wherein processing the first and second electrical audio signals comprises processing the voiced frames to estimate a speech signal by separating therefrom the ambient noise estimated from the output signals of only the second transducer.

14. The method according to claim 9, wherein the platform comprises at least three air microphones spatially disposed about the platform; and wherein processing the first electrical audio signal received at the platform comprises outputting an adaptively filtered noise signal from at least inputs from side-mounted ones of the air microphones, wherein the adaptive filtering produces an error signal, said error signal remaining after subtracting the filtered noise signal from an output signal of a forward-mounted one of the air microphones; and wherein the adaptive filtering is dynamically adaptive only during the unvoiced frames and static during the voiced frames.

15. The method according to claim 14, wherein the first transducer is one of a vibration sensor, a downward facing camera, an ultrasonic sensor and an infrared sensor.

16. The method according to claim 9, wherein the platform comprises one of eyeglasses, sunglasses, a helmet, and a headband.

17. A non-transitory memory storing a program of computer readable instructions which when executed by at least one processor result in actions comprising:

determining from at least a first electrical audio signal from a first transducer voiced frames indicating when a user is speaking and unvoiced frames indicating when the user is not speaking, wherein the first transducer is disposed on a platform configured to be removably placed symmetrically on or about a user's head and is configured to capture vibration of the user's skull or facial movement generated by the user's voice activity and to detect the user's speaking activity;

processing the first electrical audio signal received at the platform into the voiced frames and the unvoiced frames; and processing a second electrical audio signal received from at least a second transducer disposed on the platform, said second transducer being an air microphone, into voiced and unvoiced frames, wherein an equalizing function, said equalizing function being a transfer function based on clean voice content captured by the first and the second transducers, is computed, and wherein processing the first and second electrical audio signals comprises processing the unvoiced frames as noise-only frames for updating a noise profile obtained only from the first electrical audio signal, and processing the voiced frames by subtracting the noise profile therefrom and applying the equalizing function to enhance the output spectrum.

* * * * *